US012585790B2

(12) United States Patent
Xi

(10) Patent No.: US 12,585,790 B2
(45) Date of Patent: Mar. 24, 2026

(54) TRAFFIC PROCESSING METHOD AND PROTECTION SYSTEM

(71) Applicant: Huawei Technologies Co., Ltd., Shenzhen (CN)

(72) Inventor: Zhendi Xi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 133 days.

(21) Appl. No.: 18/460,302

(22) Filed: Sep. 1, 2023

(65) Prior Publication Data

US 2023/0412591 A1     Dec. 21, 2023

Related U.S. Application Data

(63) Continuation of application No. PCT/CN2021/133756, filed on Nov. 27, 2021.

(30) Foreign Application Priority Data

Mar. 3, 2021    (CN) .......................... 202110235237.8
Mar. 27, 2021    (CN) .......................... 202110328903.2

(51) Int. Cl.
G06F 21/60        (2013.01)
H04L 9/40         (2022.01)

(52) U.S. Cl.
CPC .......... G06F 21/60 (2013.01); H04L 63/0245 (2013.01)

(58) Field of Classification Search
CPC ........ G06F 21/56; G06F 21/60; G06F 21/602; G06F 21/606; G06F 21/6218; G06F 21/6245; H04L 63/0227; H04L 63/0245–0263; H04L 63/0428; H04L 63/1408–1425
See application file for complete search history.

(56) References Cited

U.S. PATENT DOCUMENTS

| | | | |
|---|---|---|---|
| 7,206,861 B1 * | 4/2007 | Callon ................... | H04L 47/10 709/242 |
| 2016/0218957 A1 * | 7/2016 | Liang ................... | H04L 45/028 |
| 2017/0250953 A1 | 8/2017 | Jain et al. | |

FOREIGN PATENT DOCUMENTS

| | | |
|---|---|---|
| CN | 102143143 A | 8/2011 |
| CN | 107145799 A | 9/2017 |

* cited by examiner

*Primary Examiner* — Kevin Bechtel
(74) *Attorney, Agent, or Firm* — Slater Matsil, LLP

(57) ABSTRACT

A method includes: A protection device obtains a local statistical result, where the local statistical result indicates frequent key data in first traffic, the local statistical result includes a plurality of entries, each of the plurality of entries includes one piece of key data and a corresponding count value, and the first traffic is traffic that passes, in a first time segment, through a network location in which the protection device is applied; the protection device replaces the key data of each entry in the local statistical result with masked data corresponding to the key data, to obtain a local masking result; and the protection device sends the local masking result to a security service server.

20 Claims, 12 Drawing Sheets

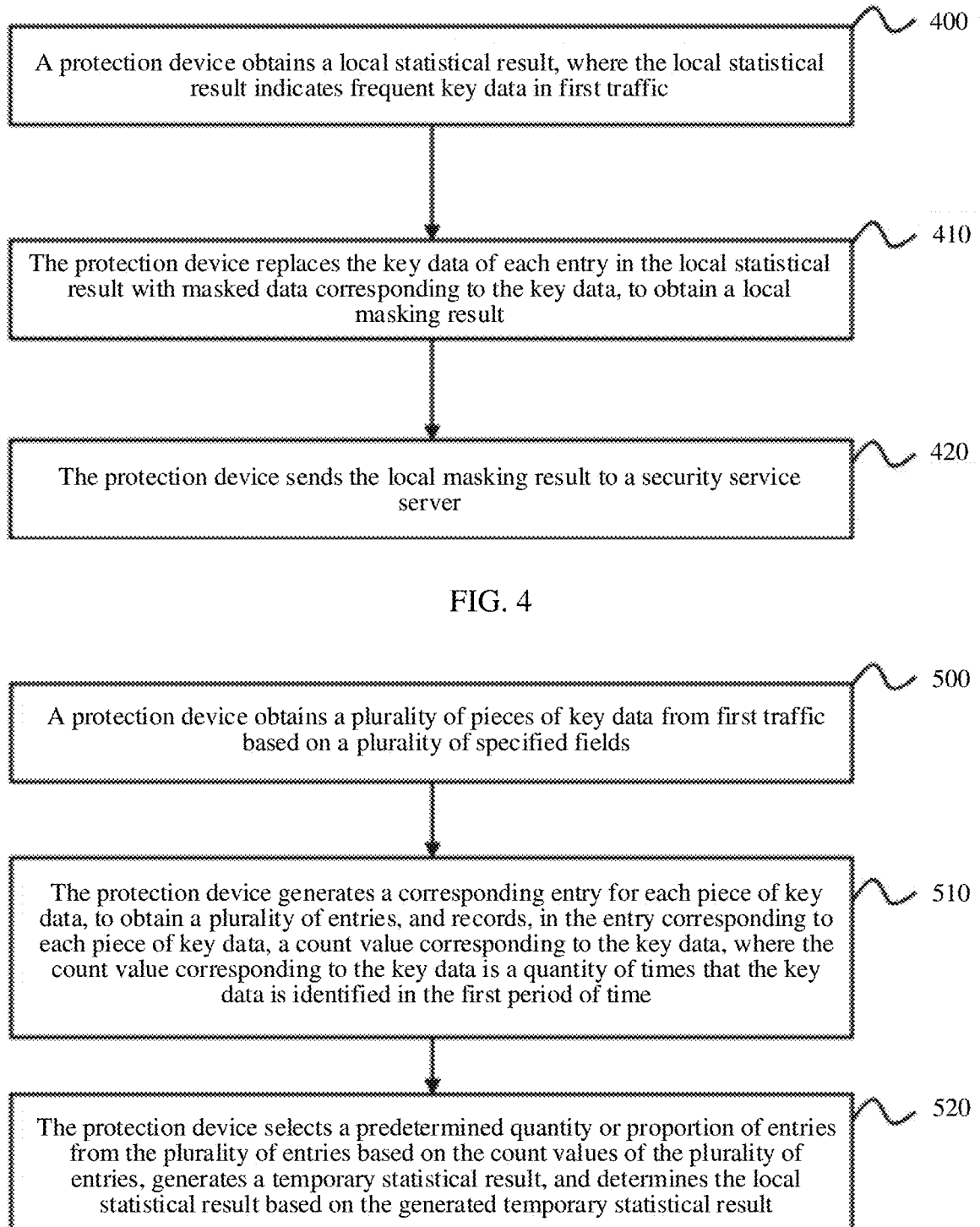

400

A protection device obtains a local statistical result, where the local statistical result indicates frequent key data in first traffic

410

The protection device replaces the key data of each entry in the local statistical result with masked data corresponding to the key data, to obtain a local masking result

420

The protection device sends the local masking result to a security service server

A protection device obtains a plurality of pieces of key data from first traffic based on a plurality of specified fields

510

The protection device generates a corresponding entry for each piece of key data, to obtain a plurality of entries, and records, in the entry corresponding to each piece of key data, a count value corresponding to the key data, where the count value corresponding to the key data is a quantity of times that the key data is identified in the first period of time

520

The protection device selects a predetermined quantity or proportion of entries from the plurality of entries based on the count values of the plurality of entries, generates a temporary statistical result, and determines the local statistical result based on the generated temporary statistical result

FIG. 5

Figure 8:
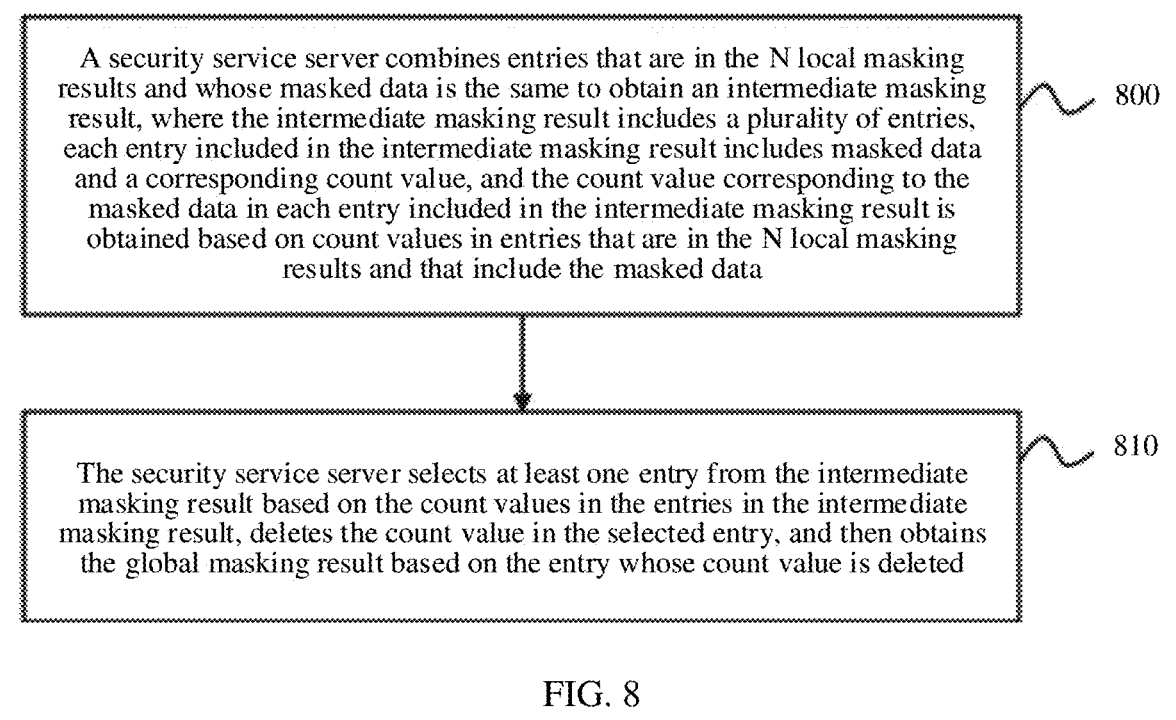

A security service server combines entries that are in the N local masking results and whose masked data is the same to obtain an intermediate masking result, where the intermediate masking result includes a plurality of entries, each entry included in the intermediate masking result includes masked data and a corresponding count value, and the count value corresponding to the masked data in each entry included in the intermediate masking result is obtained based on count values in entries that are in the N local masking results and that include the masked data

800

The security service server selects at least one entry from the intermediate masking result based on the count values in the entries in the intermediate masking result, deletes the count value in the selected entry, and then obtains the global masking result based on the entry whose count value is deleted

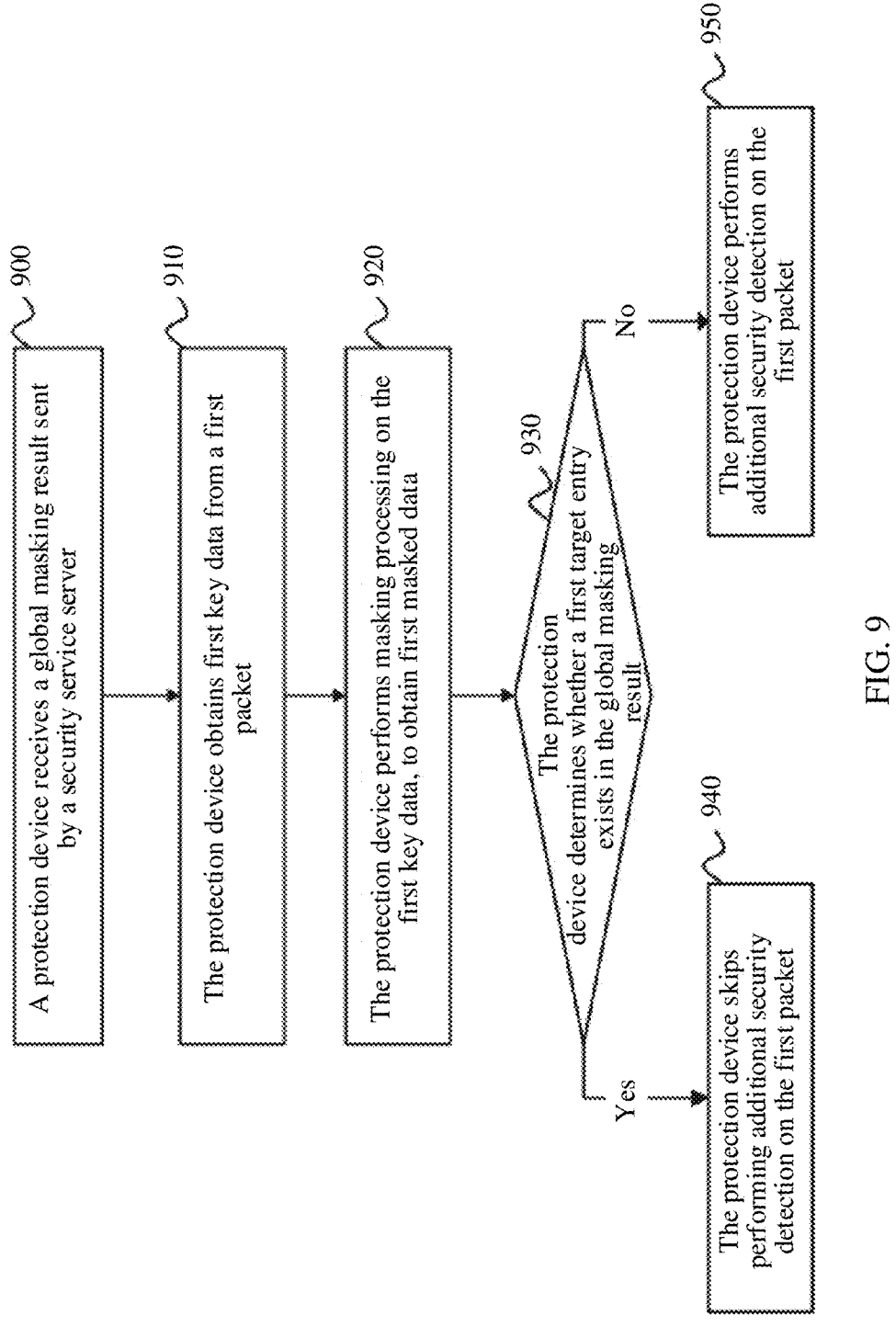

900

A protection device receives a global masking result sent by a security service server

910

The protection device obtains first key data from a first packet

920

The protection device performs masking processing on the first key data, to obtain first masked data

930

The protection device determines whether a first target entry exists in the global masking result Yes

940

The protection device skips performing additional security detection on the first packet No

950

The protection device performs additional security detection on the first packet

FIG. 9

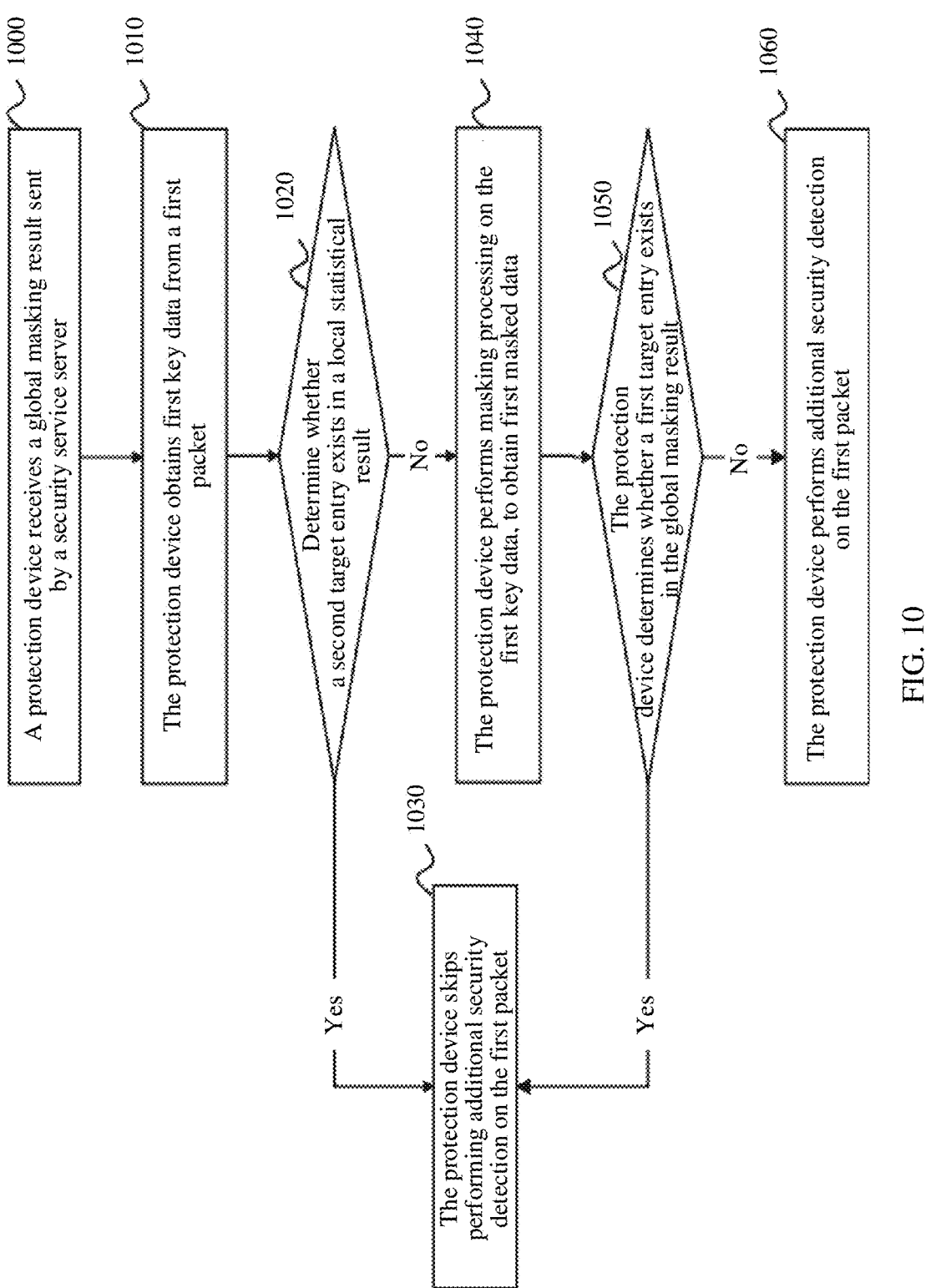

A protection device receives a global masking result sent by a security service server ~ 1000

The protection device obtains first key data from a first packet ~ 1010

Determine whether a second target entry exists in a local statistical result ~ 1020

The protection device skips performing additional security detection on the first packet ~ 1030

The protection device performs masking processing on the first key data, to obtain first masked data ~ 1040

The protection device determines whether a first target entry exists in the global masking result ~ 1050

The protection device performs additional security detection on the first packet ~ 1060

Yes

No

Yes

TRAFFIC PROCESSING METHOD AND PROTECTION SYSTEM

CROSS-REFERENCE TO RELATED APPLICATIONS

This application is a continuation of International Application No. PCT/CN2021/133756, filed on Nov. 27, 2021, which claims priority to Chinese Patent Application No. 202110235237.8, filed on Mar. 3, 2021, and Chinese Patent Application No. 202110328903.2, filed on Mar. 27, 2021. All of the aforementioned patent applications are hereby incorporated by reference in their entireties.

TECHNICAL FIELD

This application relates to the field of network security technologies, and in particular, to a traffic processing method and a protection system.

BACKGROUND

Malicious code, also referred to as malicious software (malware), is code that can execute unauthorized operations in a computer system, such as botnet viruses, network worms, Trojan viruses, and ransomware. The malicious code can be spread through web pages, emails, portable storage devices, and the like. Mostly, execution of the malicious code in the computer system causes leakage of privacy or confidential data in the computer system.

Malicious code usually aims to send confidential data to a control host or perform an action based on an instruction of the control host. Therefore, traffic is inevitably generated during execution of the malicious code. In an existing protection solution, a protection device detects traffic to and/or from a protected network, identifies traffic generated by malicious code, and then takes a corresponding measure, thereby improving network security of the protected network and reducing a possibility of attacking the protected network.

A basic process of traffic detection is as follows: The protection device performs protocol parsing on the obtained traffic to obtain key data transmitted in the traffic; performs matching between the obtained key data and signatures of malicious packets in a signature database, and identifies malicious traffic based on a matching result. Alternatively, the protection device obtains a file transferred in the traffic through protocol parsing, session reassembly, and the like, performs matching between the obtained file and a signature of a malicious file, and identifies malicious traffic based on a matching result.

With development of communication technologies, an increasing amount of data transmitted on a network poses an increasingly high requirement on processing performance of a protection device. Especially, processing performance of a protection device in in-path deployment during traffic detection directly affects users' network service experience. How to improve the processing performance of the protection device and prevent the protection device from being a bottleneck in data transmission and affecting users' network service experience is a problem to be resolved.

SUMMARY

Embodiments of this application provide a traffic processing method, to improve processing performance of a protection device.

According to a first aspect, this application provides a traffic processing method, including: A protection device obtains a local statistical result, where the local statistical result indicates frequent key data in first traffic, the local statistical result includes a plurality of entries, each of the plurality of entries includes one piece of key data and a corresponding count value, and the first traffic is traffic that passes, in a first time segment, through a network location in which the protection device is applied; the protection device replaces the key data of each entry in the local statistical result with masked data corresponding to the key data, to obtain a local masking result; and the protection device sends the local masking result to a security service server. The local masking result sent by the protection device helps the security service server collect and analyze masked data from a plurality of protection devices and then determine globally frequent masked data. The globally frequent masked data helps further improve detection performance of more protection devices subsequently. The traffic processing solution provided in embodiments of this application helps improve detection performance of a protection device while satisfying privacy security of a protected network.

Optionally, in a possible implementation of the first aspect, the method further includes: The protection device receives a global masking result sent by the security service server, where the global masking result is obtained by analyzing local masking results from at least two protection devices by the security service server, the global masking result includes at least one entry, and each entry in the global masking result includes masked data. Based on the traffic processing solution provided in embodiments of this application, after the protection device receives the global masking result, accuracy and comprehensiveness of identifying trusted traffic can be improved based on the global masking result, thereby reducing an amount of data required for the protection device to perform additional security detection, and improving detection performance of the protection device.

Optionally, in a possible implementation of the first aspect, the method further includes: The protection device obtains first key data from a first packet, and performing masking processing on the first key data to obtain first masked data, where the first packet is a packet in the traffic that passes through the network location in which the protection device is applied; and if a first target entry exists in the global masking result, the protection device skips performing additional security detection on the first packet, where the first target entry includes the first masked data. Based on the traffic processing solution provided in embodiments of this application, when trusted traffic is identified based on the global masking result, masking processing needs to be first performed on key data extracted from a packet in traffic, and matching is performed between a masking result and an entry in the global masking result. Accuracy and comprehensiveness of identifying the trusted traffic can be improved based on the global masking result, thereby reducing an amount of data required for the protection device to perform additional security detection, and improving detection performance of the protection device.

Optionally, in a possible implementation of the first aspect, after the protection device obtains the first key data from the first packet, the method further includes: If a second target entry exists in the local statistical result, the protection device skips performing additional security detection on the first packet, where the second target entry includes the first key data; or if a second target entry does not exist in the local statistical result, performing the step of performing masking processing on the first key data to obtain first masked data. Embodiments of this application provide a solution for identifying trusted traffic by combining a local statistical result and a global masking result. Specifically, the local statistical result is first used for identifying trusted traffic, and then the global masking result is used for identifying trusted traffic. When the local statistical result is used to identify trusted traffic, key data extracted from a packet does not need to be masked. Therefore, compared with identifying trusted traffic by using a global masking table, identification efficiency is higher. Therefore, using the local statistical result to identify trusted traffic first can reduce an amount of data required to identify trusted traffic using the global masking table. This combination solution can further improve the efficiency of identifying trusted traffic.

Optionally, in a possible implementation of the first aspect, each entry in the local statistical result further includes a data type of the key data in the entry, and each entry in the local masking result explicitly or implicitly indicates the data type. Adding a data type to the local statistical result helps reduce a possibility of misidentification and improve accuracy of identification.

Optionally, in a possible implementation of the first aspect, an implicit indication manner is that entries in the local masking result indicate different data types using masked data with different lengths. Compared with the explicit indication manner in which the entry includes the data type of the key data, this implicit indication manner can reduce an amount of data of each entry in the local masking result, and save transmission bandwidth between the protection device and the security service server.

Optionally, in a possible implementation of the first aspect, the method further includes: The protection device obtains second key data from a second packet, and performing the masking processing on the second key data to obtain second masked data, where the second packet is a packet in the traffic that passes through the network location in which the protection device is applied, the second key data is content of a first specified field in the second packet, and the second key data corresponds to a first data type; and if a third target entry exists in the global masking result, the protection device skips performing additional security detection on the second packet, where the third target entry includes the second masked data, and a data type indicated by the third target entry is the same as the first data type. When each entry in the global masking result further includes a data type, when identifying trusted traffic based on the global masking result, the protection device needs to match the key data in the entry, and also needs to match the data type in the entry. This identification manner can improve accuracy of identifying trusted traffic.

Optionally, in a possible implementation of the first aspect, after the protection device obtains the second key data from the second packet, the method further includes: If a fourth target entry exists in the local statistical result, the protection device skips performing additional security detection on the second packet, where the fourth target entry includes the second key data and includes a data type that is the same as the first data type; or if a fourth target entry does not exist in the local statistical result, performing the step of performing the masking processing on the second key data to obtain second masked data. Embodiments of this application provide a solution for identifying trusted traffic by combining a local statistical result and a global masking result. Compared with the foregoing combination solution, in an identification process, key data in an entry of a local statistical result or a global masking result needs to be matched, and a data type in the entry also needs to be matched. Therefore, identification efficiency can be improved, and accuracy of identifying trusted traffic can be improved.

Optionally, in a possible implementation of the first aspect, the method further includes: If the first target entry does not exist in the global masking result, the protection device performs additional security detection on the first packet. Identifying trusted traffic by using the global masking result or by combining the local statistical result and global masking result can reduce the amount of data required for the protection device to perform additional security detection, thereby improving the detection performance of the protection device.

Optionally, in a possible implementation of the first aspect, after the protection device receives the global masking result sent by the security service server, the method further includes: The protection device deletes a duplicate entry from the global masking result based on the local statistical result, where the masked data included in the duplicate entry is the same as corresponding masked data obtained by performing masking processing on key data in an entry in the local statistical result. Deduplicating the global masking result by using the local statistical result can reduce a quantity of entries in the global masking result, and avoid performing substantially repeated matching processes on a packet twice, thereby further improving efficiency of identifying trusted traffic of the protection device.

Optionally, in a possible implementation of the first aspect, that a protection device obtains a local statistical result includes: The protection device obtains a plurality of pieces of key data from the first traffic based on a plurality of specified fields, where each of the plurality of pieces of key data is content of a specified field of a packet in the first traffic; generating a corresponding entry for each piece of key data, to obtain a plurality of entries, and recording, in the entry corresponding to each piece of key data, a count value corresponding to the key data, where the count value corresponding to the key data is a quantity of times that the key data is identified in the first time segment; and selecting a predetermined quantity or proportion of entries from the plurality of entries based on the count values of the plurality of entries, generating a temporary statistical result, and determining the local statistical result based on the generated temporary statistical result.

Optionally, in a possible implementation of the first aspect, the determining the local statistical result based on the generated statistical result includes: using the generated temporary statistical result as the local statistical result. This manner in which the protection device determines the local statistical result based on a traffic statistical result in a single period has an advantage of simple and quick implementation.

Optionally, in a possible implementation of the first aspect, the determining the local statistical result based on the generated statistical result includes: obtaining at least one prior temporary statistical result, where each of the at least one prior temporary statistical result is obtained based on traffic that passes, in a time segment before the first time segment, through the network location in which the protection device is applied; and combining entries, whose key data is the same, in the generated temporary statistical result and the prior temporary statistical result, to obtain the local statistical result, where a count value corresponding to key data in the local statistical result is obtained based on count values in entries, including the key data, in the generated temporary statistical result and the prior temporary statistical result. Burst traffic in a single period is not likely to be trusted traffic, but may be caused by an attack. This manner in which the protection device determines the local statistical result based on traffic statistical results in a plurality of periods can avoid that burst traffic in a single period from being learned into the local statistical result and further interfering with the security service server in determining the global masking result. This manner of determining a local statistical result based on traffic statistical results in a plurality of periods can improve accuracy of identifying trusted traffic.

Optionally, in a possible implementation of the first aspect, the determining the local statistical result based on the generated temporary statistical result includes: obtaining at least one prior temporary statistical result, where each of the at least one prior temporary statistical result is obtained based on traffic that passes, in a time segment before the first time segment, through the network location in which the protection device is applied; and combining entries that are in the generated temporary statistical result and the prior temporary statistical result, whose key data is the same, and whose data types are the same to obtain the local statistical result, where a count value corresponding to key data in the local statistical result is obtained based on count values in the entries, including the key data and with same whose data types, in the generated temporary statistical result and the prior temporary statistical result. Determining the local statistical result is based on traffic statistical results in a plurality of periods with reference to the data type can further improve the accuracy of identifying trusted traffic.

Optionally, in a possible implementation of the first aspect, a count value corresponding to key data in the local statistical result is:

$$P\,\text{count}\,(\text{Key}) = \left(\frac{2c}{M}\right) * \sum_{i=0}^{M}(\text{Count}\,(\text{key}_i) * I/A\,\text{count})$$

$$A\,\text{count} = \sum_{j=0}^{n}\text{Count}_j,$$

where M is a total quantity of temporary statistical results including the prior temporary statistical result and the generated temporary statistical result, M is a natural number greater than or equal to 2, I is a natural number, Acount is a sum of count values of all entries in the prior temporary statistical result and the generated temporary statistical result, n is a quantity of all the entries in the prior temporary statistical result and the generated temporary statistical result, Pcount(Key) is a count value of key data (key) in the local statistical result, c is a quantity of temporary statistical results having entries that include the key data (key), and Count(key$_i$) is a count value in an entry, including the key data (key), in an i$^{th}$ temporary statistical result.

Optionally, there are many masking manners. In a possible implementation of the first aspect, the masked data is obtained by performing a hash operation on the key data. In other words, the masked data is a digital digest (that is, a hash value) of the corresponding key data. Because a hash operation is an irreversible operation, after the protection device sends the local masking result, a receiver of the local masking result, for example, a security service server or another third party that obtains the local masking result in a legal or illegal manner, cannot obtain original data through data cracking or data recovery. Therefore, this manner is highly secure, satisfying a privacy protection requirement of an owner of the local statistical result.

Optionally, in a possible implementation of the first aspect, the count value includes an occurrence frequency or occurrence times.

According to a second aspect, an embodiment of this application provides a traffic processing method, including: A security service server receives N local masking results, where each of the N local masking results comes from a protection device, N is a natural number greater than or equal to 2, each local masking result includes a plurality of entries, and each entry included in each local masking result includes masked data and a corresponding count value; the security service server generates a global masking result based on the N local masking results, where the global masking result includes a plurality of entries, each entry included in the global masking result includes masked data, and the masked data included in the global masking result is a subset of the masked data included in the N local masking results; and the security service server sends the global masking result to a protection device.

In this embodiment of this application, after analyzing the local masking results of the plurality of protection devices, the security service server shares, with each protection device, the global masking result that is used as an analysis result, thereby expanding data that is on the protection device and that is used to configure an identification policy, so that the protection device can identify more trusted traffic, thereby further reducing an amount of data required to perform additional security detection.

Optionally, in a possible implementation of the second aspect, that the security service server generates the global masking result based on the N local masking results includes: The security service server combines entries that are in the N local masking results and whose masked data is the same to obtain an intermediate masking result, where the intermediate masking result includes a plurality of entries, each entry included in the intermediate masking result includes masked data and a corresponding count value, and the count value corresponding to the masked data in each entry included in the intermediate masking result is obtained based on count values in entries that are in the N local masking results and that include the masked data; and the security service server selects at least one entry from the intermediate masking result based on the count values in the entries in the intermediate masking result, deletes the count value in the selected entry, and then obtains the global masking result based on the entry whose count value is deleted. The security service server obtains the global masking result by combining entries that are in a plurality of local masking results and whose masked data is the same. Therefore, an entry in the global masking result reflects masked data corresponding to frequent key data in a large range. In other words, the masked data in the global masking result is characterized by both frequent occurrence and wide occurrence, which helps identify trusted traffic.

Optionally, in a possible implementation of the second aspect, that the security service server selects the at least one entry from the intermediate masking result based on the count values in the entries in the intermediate masking result includes: The security service server selects, from the intermediate masking result based on an order of count values from high to low, a predetermined quantity or proportion of entries including high count values.

Optionally, in a possible implementation of the second aspect, the count value corresponding to the masked data in each entry included in the intermediate masking result is a weighted sum of the count values in the entries that are in the N local masking results and that include the masked data, and the weighted sum is positively correlated with a sum of the count values of the entries that are in the N local masking results and that include the masked data, is positively correlated with a quantity of the entries that are in the N local masking results and that include the masked data, and is negatively correlated with N. A sum of count values in entries that are in the N local masking results and that include the masked data reflects an occurrence frequency of key data represented by one piece of masked data, and a quantity of entries that are in the N local masking results and that include the masked data reflects an occurrence breadth of key data represented by one piece of masked data. The global masking result determined in the foregoing manner helps the protection device accurately identify trusted traffic.

Optionally, in a possible implementation of the second aspect, the count value corresponding to the masked data in each entry included in the intermediate masking result is obtained according to the following formula:

$$C \, \text{count (hash\_key)} = \left(\frac{kc}{N}\right) * \sum_{i=0}^{N} P \, \text{count (hash\_key}_i)$$

where hash_key is masked data included in a first entry in the intermediate) masking result, Ccount(hash_key) is a count value corresponding to the masked data included in the first entry, i is an identifier of a local masking result, $$\sum_{i=0}^{N} P \, \text{count (hash\_key}_i)$$

is a sum of count values in all entries that are in the N local masking results and that include the masked data hash_key, c is occurrence times of the masked data hash_key in the N local masking results, and a value of k is a natural number ranging from 1 to 10.

Optionally, in a possible implementation of the second aspect, each entry included in each local masking result further explicitly or implicitly indicates a data type, and each entry included in the global masking result further explicitly or implicitly indicates the data type.

Optionally, in a possible implementation of the second aspect, that the security service server generates the global masking result based on the N local masking results includes: The security service server combines entries that are in the N local masking results, whose masked data is the same, and whose data types are the same to obtain an intermediate masking result, where the intermediate masking result includes a plurality of entries, each entry included in the intermediate masking result includes masked data and a corresponding count value, and the count value corresponding to the masked data in each entry included in the intermediate masking result is obtained based on count values in entries that are in the N local masking results and that include the masked data; and the security service server selects at least one entry from the intermediate masking result based on the count values in the entries in the intermediate masking result, deletes the count value in the selected entry, and then obtains the global masking result based on the entry whose count value is deleted. When generating the global masking result, the security service server combines the masked data and the data type in the entry of the local masking result, so that accuracy of identifying trusted traffic based on the global masking result can be improved.

According to a third aspect, an embodiment of this application provides a protection system. The protection system includes a memory and at least one processor. The memory is configured to store instructions; and after the instructions are read by the at least one processor, the protection system performs the method in the first aspect or any possible implementation of the first aspect. For details, refer to the foregoing detailed descriptions. Details are not described herein again.

According to a fourth aspect, an embodiment of this application provides a protection system. The protection system has functions of implementing the method in the first aspect or any possible implementation of the first aspect. The function may be implemented by hardware, or may be implemented by hardware executing corresponding software. The hardware or the software includes one or more modules corresponding to the foregoing functions.

According to a fifth aspect, an embodiment of this application provides a security service system. The security service system includes a memory and at least one processor. The memory is configured to store instructions; and after the instructions are read by the at least one processor, the security service system performs the method in the first aspect or any possible implementation of the first aspect. For details, refer to the foregoing detailed descriptions. Details are not described herein again.

According to a sixth aspect, an embodiment of this application provides a security service system. The security service system has functions of implementing the method in the second aspect or any possible implementation of the second aspect. The functions may be implemented by hardware, or may be implemented by hardware executing corresponding software. The hardware or the software includes one or more modules corresponding to the foregoing functions.

According to another aspect, an embodiment of this application provides a computer storage medium, configured to store computer software instructions used by the foregoing protection device. The computer software instructions include a program designed for performing the first aspect or any possible implementation of the first aspect, or include a program designed for performing the second aspect or any possible implementation of the second aspect.

According to another aspect, an embodiment of this application further provides a computer program product including instructions. When the computer program product runs on a computer, the computer is enabled to perform the method according to the first aspect or any possible implementation of the first aspect, or the computer is enabled to perform the method according to the second aspect or any possible implementation of the second aspect.

According to another aspect, an embodiment of this application provides a chip, including a memory and a processor. The memory is configured to store computer instructions, and the processor is configured to invoke the computer instructions from the memory and run the computer instructions, to perform the method according to the first aspect or any possible implementation of the first aspect, or perform the method according to the second aspect or any possible implementation of the second aspect.

BRIEF DESCRIPTION OF THE DRAWINGS

To describe the technical solutions in embodiments of this application more clearly, the following briefly describes the accompanying drawings for describing embodiments. It is clear that the accompanying drawings in the following description show merely some embodiments of this application, and a person of ordinary skill in the art may still derive other drawings from these accompanying drawings without creative efforts.

FIG. 4 is a flowchart of a traffic processing method according to an embodiment of this application;

FIG. 5 is a flowchart of a specific process in which a protection device obtains a local statistical result according to an embodiment of this application;

FIG. 8 is a flowchart of a method for generating a global masking result based on a plurality of local masking results according to an embodiment of this application;

FIG. 9 is a flowchart of performing, by a protection device, traffic identification based on a global masking table sent by a security service server according to an embodiment of this application;

FIG. 10 is a flowchart of performing traffic identification by combining a local statistical result and a global masking result according to an embodiment of this application;

DETAILED DESCRIPTION OF ILLUSTRATIVE EMBODIMENTS

With development of communication technologies, traffic transmitted on a network is increasing. When a protection device detects the traffic, a requirement on processing performance of the protection device is increasingly high. Traffic processing performance of a protection device deployed in an in-path mode directly affects users' network experience.

By analyzing a detection mechanism of the protection device, it is found that the most processing resources are consumed in detection processes related to suspicious and unknown traffic, such as session-based status detection, file detection, antivirus (AV) detection, and the like. In the session-based status detection, it is necessary to detect traffic based on context information of a plurality of sessions or a plurality of packets in a same session. In the file detection, it is necessary to obtain, through session restoration, files transferred in sessions, then perform signature matching between the obtained files based on a malicious file signature database, and so on. In embodiments of this application, the foregoing detection related to suspicious and unknown traffic in the protection device is referred to as additional security detection.

Figure 1:
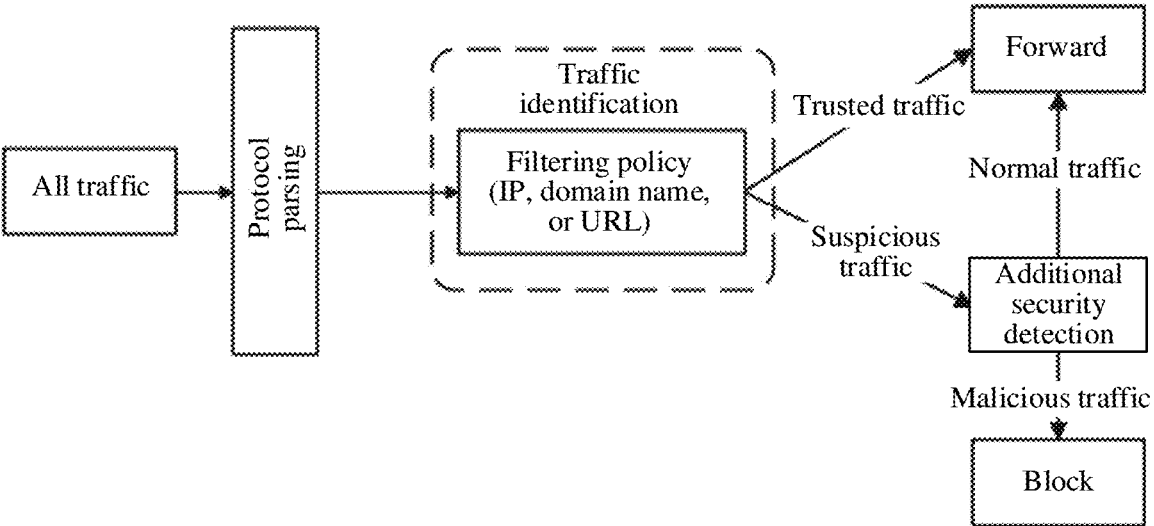
FIG. 1 is a schematic diagram of a detection mechanism on a protection device according to an embodiment of this application.

To improve processing performance, after performing simple protocol-layer parsing on input traffic, the protection device first performs simple identification on all the input traffic to identify whether the traffic is known trusted traffic or suspicious traffic. If the traffic is trusted traffic, the protection device skips performing the foregoing additional security detection and directly forwards the traffic. That is to say, the trusted traffic is unblocked. If the traffic is suspicious traffic, the protection device performs the foregoing additional security detection and determines, based on a detection result, whether to unblock the suspicious traffic or block the suspicious traffic. FIG. 1 is a schematic diagram of a detection mechanism for identifying trusted traffic on a protection device. In embodiments of this application, trusted traffic is traffic generated when a known trusted resource is accessed. The trusted resource includes a known trusted Internet Protocol (IP) address, a known trusted domain name, a known trusted uniform resource locator (URL), a mainstream trusted hot website, and the like.

By configuring an identification policy on the protection device, the protection device can identify whether traffic is trusted traffic. Accordingly, the configured identification policy includes an identifier of the trusted resource, thereby helping identify the trusted traffic. For example, the identification policy includes a trusted IP address, a trusted URL, a trusted domain name, and the like. In other words, the identification policy may also be considered as a whitelist. The protection device obtains, from the traffic, data that can describe a resource accessed by the traffic, and if the obtained data matches the data in the identification policy, determines that the traffic is trusted traffic and skips performing the foregoing additional security detection, so that processing resources consumed by the protection device for detecting the trusted traffic are reduced. In this case, the protection device only needs to perform the foregoing additional security detection on traffic (that is, suspicious traffic) that does not belong to trusted traffic, to reduce an amount of data required to perform the additional security detection, thereby improving processing performance of the protection device.

The identification policy is usually configured when the protection device is deployed on a network for the first time, and may be manually configured by an administrator, or may be remotely configured by a protection device vendor. The identification policy configured in this way can identify common trusted traffic. For example, the identification policy includes a domain name of a mainstream trusted hot website.

In an actual use process, it is found that the identification policy configured in the foregoing manner has some limitations. For example, only trusted traffic that is the most common to a configuration person can be identified. However, trusted traffic common to different protected networks varies based on different enterprise services. In addition, trusted traffic common to a same protected network in different periods also varies with transformation of enterprise services. To achieve a good performance improvement effect, the administrator needs to analyze actual traffic on the network and then manually adjust the identification policy after the protection device is deployed on the network. As a result, maintenance costs are high.

Embodiments of this application provides a traffic processing method for a protection device. The protection device collects statistics on actual traffic that passes through a network location in which the protection device is actually applied, to obtain a local statistical result. The local statistical result is used to describe frequent key data in local actual traffic of the protection device, facilitating configuration of an identification policy by using the local statistical result, thereby identifying trusted traffic in to-be-detected traffic. The key data in embodiments of this application is data that helps identify an accessed resource or an accessed object in a packet. The local statistical result can well adapt to an actual network scenario in terms of identifying trusted traffic.

To further improve an identification effect of the identification policy on trusted traffic and enable the protection device to identify more trusted traffic, one idea is to share key data for configuring the identification policy among a plurality of protection devices, to make it convenient to obtain more abundant data for configuring the identification policy. However, such key data as statistical data related to local network traffic of an enterprise is also a type of sensitive data. If the type of data is leaked, normal services of the enterprise may be adversely affected. For the purpose of privacy protection, many enterprises do not share statistical data related to local network traffic of the enterprises with others. To resolve this problem, embodiments of this application proposes that the protection device performs masking (data masking or data obfuscation) on the key data in the local statistical result, and then sends the masked key data to a security service server, allowing the security service server to collect and analyze masked data (masked data) from a plurality of protection devices to obtain an analysis result. The analysis result reflects globally frequent key data. The security service server shares the analysis result with each protection device, thereby expanding data that is on each protection device and that is used to configure an identification policy, so that the protection device can identify more trusted traffic, thereby further reducing an amount of data required for the protection device to perform additional security detection. The security service server only analyzes and processes the masked data, but cannot learn of the actual meaning of the masked data. Therefore, a privacy protection requirement is satisfied.

Main implementation principles and specific implementations of the technical solutions in embodiments of the present invention, and corresponding advantageous effects achievable by the technical solutions in embodiments of the present invention are described in detail below with reference to the accompanying drawings.

The traffic processing solution provided in embodiments of this application is applicable to a plurality of different network scenarios, and improves an effect of filtering trusted traffic. The detection performance of the protection device is improved without hardware upgrading.

Figure 2:
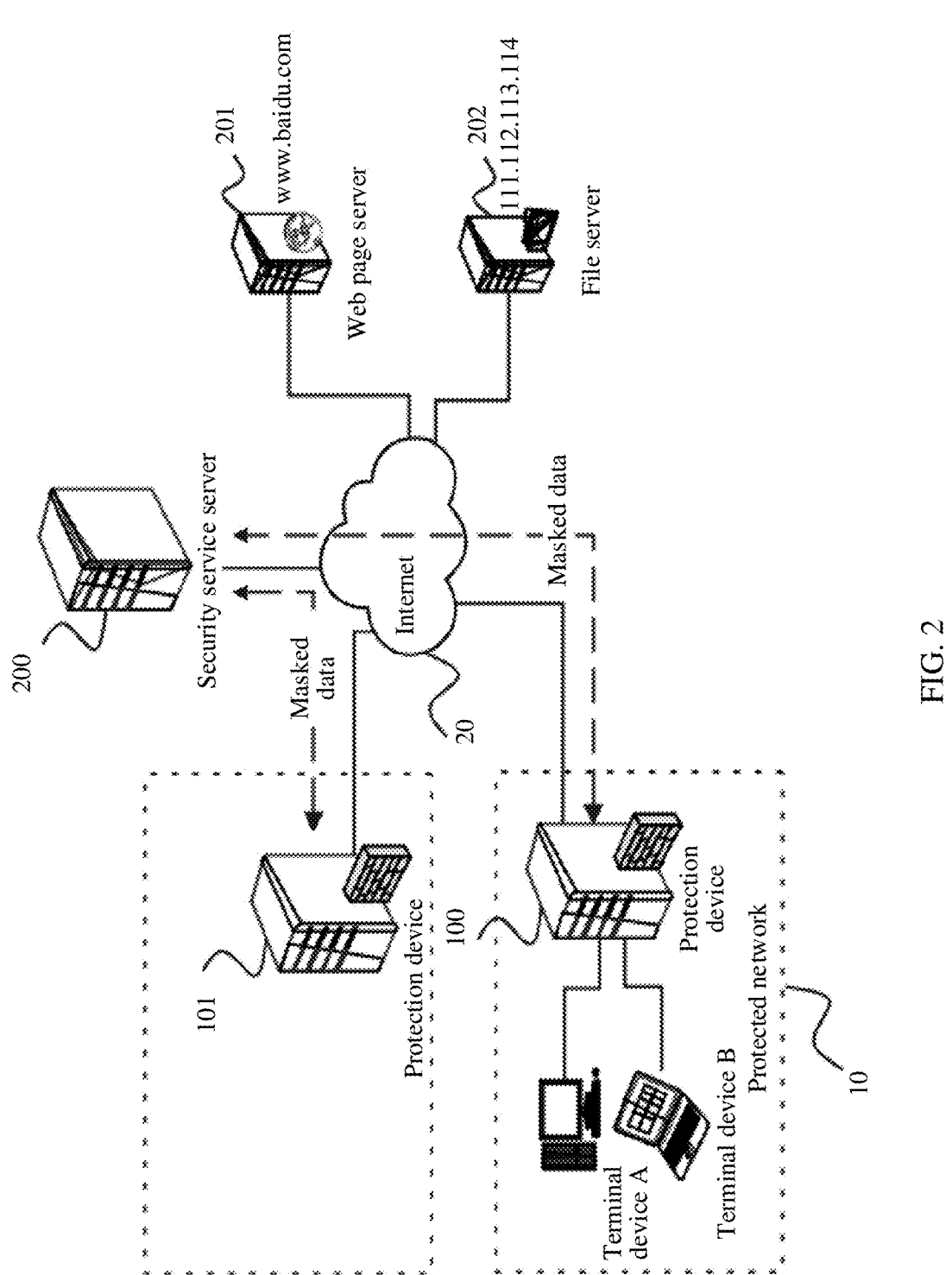
FIG. 2 is a schematic diagram of an application scenario of a traffic processing solution according to an embodiment of this application.
Figure 3:
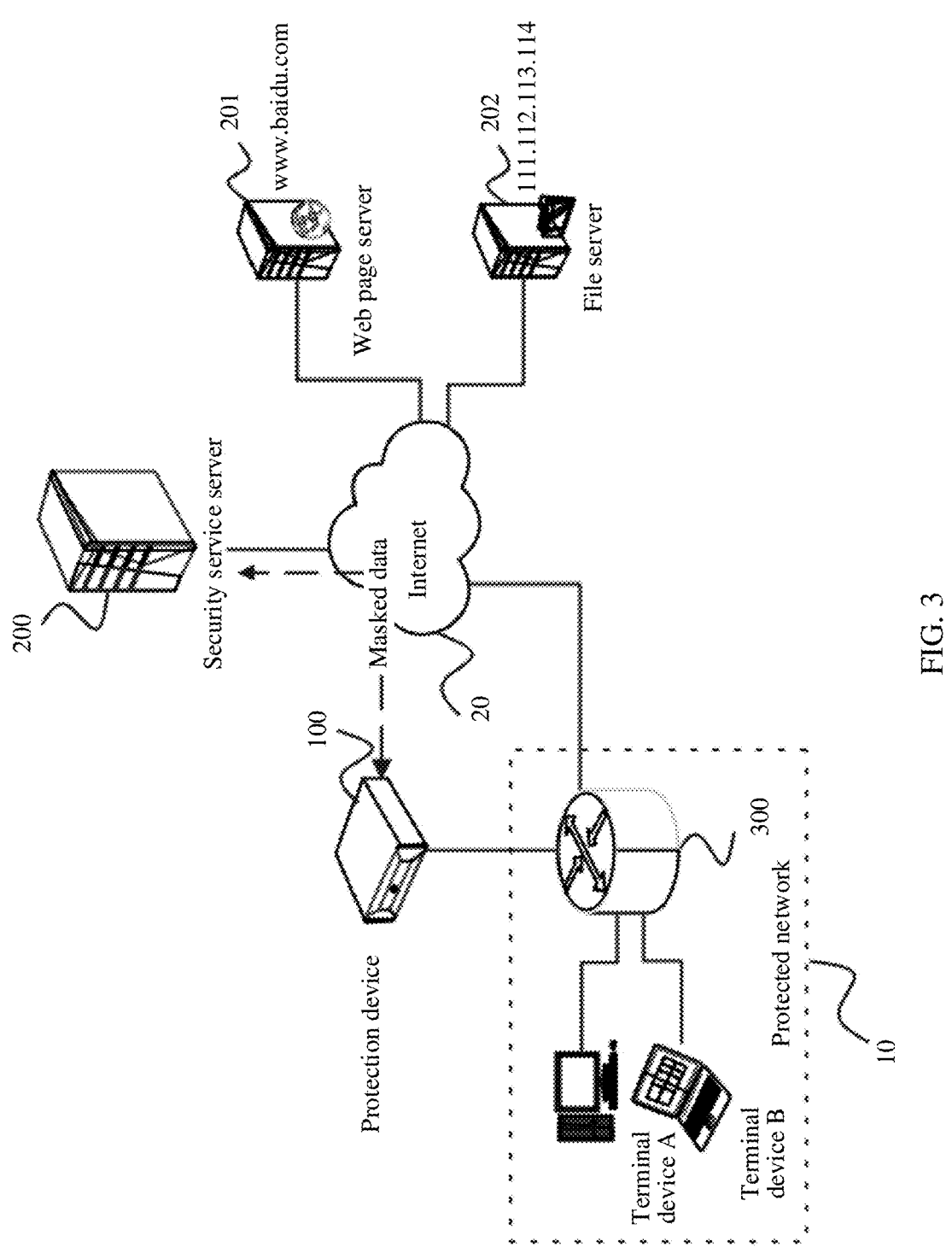
FIG. 3 is a schematic diagram of another application scenario of a traffic processing solution according to an embodiment of this application.

The traffic processing method provided in embodiments of this application is performed by a protection device deployed on a protected network or a security service server that can communicate with a protection device. Optionally, the protection device includes a firewall, a security gateway, a unified threat management (UTM) device, or a cyber security intelligence system (CIS). Deployment modes of the protection device include in-path deployment (as shown in FIG. 2) and off-path deployment (as shown in FIG. 3). The following describes the traffic processing system provided in embodiments of this application with reference to a plurality of deployment modes.

FIG. 2 is a schematic diagram of an application scenario of a traffic processing solution according to an embodiment of this application. The traffic processing system provided in embodiments of this application includes a security service server and one or more protection devices. In FIG. 2, two protection devices are used as an example for description, and are specifically a protection device 100 and a protection device 101. The protection device 100 is used as an example to describe a deployment mode of the protection device. A network 10 is a network protected by the protection device 100 that is briefly referred to as a protected network in this embodiment of this application, for example, a local area network of an enterprise. The protected network includes a plurality of terminal devices. Herein, a terminal device A and a terminal device B are used as an example. The terminal device in the protected network can access, through the protection device 100 and the Internet 20, services provided by a plurality of service servers. These service servers include but are not limited to a web page server, a file server, a game server, an electronic shopping server, a video sharing server, and the like. In this embodiment, a file server 202 whose IP address is 111.112.113.114 and a web page server 201 whose domain name is www.baidu.com are used as an example for description. Traffic generated when the terminal device in the network 10 accesses the file server 202 or the web page server 201 is subject to security detection through the protection device and then forwarded.

The protection device 100 in FIG. 2 is deployed on a data transmission path between the network 10 and a network 20 in an in-path mode. For example, when the protection device 100 is a firewall or a security gateway, the protection device 100 is generally deployed at an edge of the network 10. The protection device 100 is configured to perform security detection or access control on traffic entering and leaving the network 10, and block risky malicious traffic, to ensure security of the network 10. The traffic entering and leaving the network 10 is, for example, traffic generated when a terminal in the network 10 accesses the web page server 201 in the Internet, or traffic generated when a terminal in the network 10 accesses the file server 202 in the Internet.

In addition, traffic statistical data is transmitted between the protection device 100 and the security service server. In FIG. 2, one protection device 100 is used as an example for description. The security service server communicates with a plurality of protection devices including the protection device 100, analyzes and processes traffic statistical data sent by the plurality of protection devices, and provides a processing result to one or more protection devices.

FIG. 3 is a schematic diagram of an application scenario of a traffic processing solution according to an embodiment of this application. The traffic processing system provided in embodiments of this application includes a protection device 100 and a security service server. Similar to FIG. 2, a network 10 is a network protected by the protection device 100, and a file server 202 whose IP address is 111.112.113.114 and a web page server 201 whose domain name is www.baidu.com provide a service for another device via the Internet 20. Different from FIG. 2, the protection device 100 is, for example, a CIS, connected to a traffic collection device 300, and receives mirrored traffic from the traffic collection device 300. The traffic collection device 300 is deployed on a data transmission path between the network 10 and the Internet 20, and the traffic collection device 300 is, for example, a firewall, a gateway, a switch, or a router. The traffic collection device 300 mirrors traffic passing through this device, and sends mirrored traffic to the protection device 100. The protection device 100 performs security detection on the traffic provided by the traffic collection device 300, and generates a log or report based on a security detection result for a network administrator to view. The traffic collection device 300 forwards the traffic without waiting for a detection result of the protection device 100.

It should be noted that, when the security service server communicates with a plurality of protection devices, a deployment mode of the plurality of protection devices is not limited. In other words, the plurality of protection devices all adopt the in-path deployment mode shown in FIG. 2, or all adopt the off-path deployment mode shown in FIG. 3, or some protection devices adopt the in-path deployment mode shown in FIG. 2, and other protection devices adopt the off-path deployment mode shown in FIG. 3. Optionally, the security service server in FIG. 2 or FIG. 3 is located in the Internet.

The protection device 100 in each of FIG. 2 and FIG. 3 may perform the traffic processing method provided in embodiments of this application. First, the protection device 100 obtains traffic passing, in a first time segment, through a network location in which the protection device 100 is applied (briefly referred to as "first traffic"). Optionally, the network location in which the protection device 100 is applied is a network location in which the protection device is deployed, or a network location in which one or more collection devices that are communicatively connected to the protection device are deployed. In the network scenario shown in FIG. 2, a network location in which the protection device 100 is applied is a network location in which the protection device is deployed, and traffic obtained by the protection device 100 is traffic that passes through the protection device 100 in the first time segment. In the network scenario shown in FIG. 3, a network location in which the protection device 100 is applied is a network location in which the collection device 300 connected to the protection device 100 is deployed, and traffic obtained by the protection device 100 is traffic collected in the first time segment and sent by the traffic collection device 300, or traffic passing through the traffic collection device 300 in the first time segment.

Further, the protection device 100 obtains a local statistical result based on the first traffic, where the local statistical result indicates frequent key data in the first traffic. The local statistical result includes a plurality of entries, and each entry is used to describe one piece of key data that occurs in the first traffic. Each entry includes one piece of key data and a corresponding count value.

The protection device 100 performs masking processing on the key data of each entry in the local statistical result to obtain corresponding masked data, and replaces the key data in the corresponding entry in the local statistical result with the masked data, to obtain a local masking result. Masking processing is a process of shielding original data by using modified content. It is difficult to obtain the original data without being subject to masking processing based on the data subject to masking processing. The protection device sends the local masking result to the security service server.

The security service server receives local masking results from the plurality of protection devices. Further, the security service server generates a global masking table based on the received plurality of local masking results. The global masking table includes a plurality of entries, and each entry in the global masking table includes masked data. The masked data included in the global masking table is a subset of the masked data included in the plurality of local masking results. The security service server sends the global masking table to the protection device, to make it convenient for the protection device to be able to use the global masking table to increase the amount of data for identifying trusted traffic.

FIG. 4 is a flowchart of a traffic processing method according to an embodiment of this application. FIG. 4 describes a traffic processing solution from a perspective of a protection device. The traffic processing method in FIG. 4 includes step 400 to step 420. Optionally, the protection device in FIG. 4 is the protection device 100 or the protection device 101 in FIG. 2 or FIG. 3.

Step 400: The protection device obtains a local statistical result, where the local statistical result indicates frequent key data in first traffic. The local statistical result includes a plurality of entries, and each of the plurality of entries includes one piece of key data and a corresponding count value. The first traffic is traffic that passes, in a first time segment, through a network location in which the protection device is applied.

Using the in-path deployment scenario shown in FIG. 2 as an example, the first traffic is traffic that enters and leaves the protected network 10 and that passes through the protection device 100 in the first time segment.

The off-path deployment scenario shown in FIG. 3 is used as an example. The first traffic is traffic that is collected in the first time segment, that is sent by the traffic collection device 300, and that is obtained by the protection device 100, or traffic that passes through the traffic collection device 300 in the first time segment, or the first traffic is traffic that is sent by the traffic collection device 300 and that is received by the protection device 100 in the first time segment.

In this embodiment of this application, the key data is data that helps identify trusted traffic. In other words, the key data is data that helps identify an object or a resource accessed by traffic. The key data includes but is not limited to an IP address, a combination of an IP address and a port number, a domain name, a URL, and an email sender. A location of the key data in a packet is related to a protocol. The protection device parses the protocol of the packet in the traffic to obtain the key data from a specified field of the packet.

For example, after performing layer-3 (network layer) protocol parsing on a packet, the protection device obtains an IP address from a source IP address field or a destination IP address field of a packet header based on an IP protocol format.

For example, after performing layer-7 (application layer) protocol parsing on a packet, the protection device obtains host information from a host field in an HTTP packet header based on an HI IP protocol format. The protection device then obtains a resource identifier from a Request URI field of the HTTP packet header, and combines the host information obtained from the host field and the resource identifier obtained from the Request URI field to obtain a URL.

In embodiments of this application, a count value reflects a frequency of occurrence of key data in traffic. Generally, when a count value of a piece of key data is higher, the key data occurs more frequently in traffic.

The protection device obtains a local statistical result based on a quantity of times that one piece of key data is identified in the first traffic. A detailed process is described in detail below with reference to a plurality of specific embodiments. Optionally, the local statistical result may be presented in a plurality of forms, for example, presented in a form of an array or a list. When the local statistical result is presented in a list, the local statistical result is in a form shown in FIG. 1. In the following embodiments, a local statistical result is described by using a local statistical table as an example. It is assumed herein that the local statistical table obtained by the protection device in this embodiment is shown in Table 1.

TABLE 1

| Key data | Count value |
|---|---|
| https://111.122.133.144/index.html | 2021 |
| 111.112.113.114 | 2001 |
| www.baidu.com | 1997 |

Step 410: The protection device replaces the key data of each entry in the local statistical result with masked data corresponding to the key data, to obtain a local masking result.

If the security service server can obtain traffic statistical data of a plurality of protection devices, the security service server can easily determine globally frequent key data. After the globally frequent key data is provided to the protection device, the protection device can identify trusted traffic more effectively. To satisfy requirements of both availability and privacy security of globally frequent key data, in this embodiment of this application, before sending the local statistical result (for example, the local statistical table shown in Table 1) to the security service server, the protection device first performs masking processing on key data in the local statistical result.

The masking processing includes a plurality of feasible manners. A specific masking manner is not limited in this embodiment of this application, provided that a receiver of the masked data cannot restore unmasked original data. For example, a masking manner is to delete a part of the original data, for example, delete the first 10 bits or the last 10 bits of the original data. Another masking manner is data replacement. For example, a part of the original data is replaced with a specified character string (for example, a character string "XXX").

Another masking manner is to calculate a digital digest. Specifically, the original data (that is, the key data in this embodiment) is input into a digital digest algorithm, to calculate a digital digest of the key data, and the digital digest obtained through calculation is used as corresponding masked data. The digital digest algorithm is also referred to as a hash algorithm or a hash function.

For example, the protection device inputs key data www.baidu.com in the entry in the third row of Table 1 into the hash algorithm, to obtain corresponding masked data DABi9E82E1F9A681EF73346D3E7A575E.

Optionally, the local masking result obtained by performing the masking processing on the key data in the local statistical result may be presented in a plurality of forms, for example, presented in a form of an array or a list.

When the local masking result is presented in a list, the local masking result is in a form shown in FIG. 2. In the following embodiments, a local statistical result is described by using a local statistical table as an example. It is assumed herein that the local statistical table obtained by the protection device in this embodiment is shown in Table 1.

TABLE 2

| Masked data | Count value |
|---|---|
| DAB19E82E1F9A681EE73346D3E7A575E | 2021 |
| 59C7918EC1CC9A0C4DFED374468490F2 | 2001 |
| DAB19E82E1F9A681EE73346D3E7A575E | 1997 |

Step 420: The protection device sends the local masking result to the security service server.

After establishing a communication connection to the security service server, the protection device sends, through the communication connection, a local masking result (for example, a local statistical table shown in Table 2) generated by the protection device. A protocol on which the communication connection is based is not limited in this embodiment of this application. Optionally, the communication connection is established between the protection device and the security service server by using the Transmission Control Protocol (TCP), the User Datagram Protocol (UDP), the Hypertext Transfer Protocol (HTTP), or the Hypertext Transfer Protocol Secure (HTTPS).

Optionally, the security service server provides a global statistics service for the protection device in a license manner. For example, the protection device registers with the security service server in advance based on a device identifier. The device identifier of the protection device includes but is not limited to an electronic serial number (ESN). An ESN is data used to uniquely identify a device, and is also referred to as an electronic label of the device. For example, the ESN is 1020608946. Because the ESN is a unique ID, the security service server may conveniently store and search for, based on the ESN, the local masking result sent by the protection device. Alternatively, the device identifier is an IP address or a MAC address.

The protection device in this embodiment of this application collects statistics on actual traffic that passes through a network location in which the protection device is actually applied, to obtain a local statistical result used to describe frequent key data in local actual traffic of the protection device. The protection device masks the key data in the local statistical result, and then sends the masked key data to the security service server, allowing the security service server to collect and analyze masked data from a plurality of protection devices and then determine globally frequent masked data. The globally frequent masked data helps further improve detection performance of more protection devices subsequently. The traffic processing solution provided in embodiments of this application can improve detection performance of a protection device while satisfying privacy security of a protected network.

Optionally, the protection device periodically executes the method shown in FIG. 4 to determine the local masking result, and an execution period is a length of the first time segment. A process of executing the traffic processing method by the protection device each time is similar. The process shown in FIG. 4 is described by using one execution process as an example, that is, the first time segment as an example. An administrator of the traffic processing system or an administrator of the protection device may set an execution period based on an actual situation. For example, the execution period may be set to every hour, every day, or every week, or certainly may be set to every two days or every two hours. When the execution period is set to every day, the first time segment is, for example, from 00:00 on Jan. 10, 2020 to 00:00 on Jan. 11, 2020.

In actual application, misidentification may occur when the trusted traffic is identified based on only the key data. For example, the traffic includes two packets, where a destination IP address of a first packet is 111.112.113.114, which indicates that the first packet is a resource provided by a computer whose IP address is 111.112.113.114 in the Internet and that is accessed by a terminal in the protected network. A second packet in the two packets is an HTTP response packet whose payload part carries a character string "https://111.122.133.144/index.html", which indicates that 111.112.113.114 is a part of a URL, but cannot indicate that the terminal in the protected network is accessing a resource provided by the computer whose IP address is 111.112.113.114. In the foregoing example, the first packet and the second packet are not necessarily packets generated when a same resource is accessed. Optionally, to improve identification accuracy of identifying, based on the key data, the data of the resource accessed by the traffic, and avoid misidentification, when the protection device performs step 400 in FIG. 4, each entry in the local statistical result further includes a data type or a data type indicator of the key data in the entry (when the local statistical result is presented as a local statistical table, a local masking table including the data type is shown in Table 3) on the basis of the key data and the count value, to distinguish an actual meaning of the key data. For example, in this embodiment of this application, the data type of the key data includes an IP address (hereinafter briefly referred to as "IP"), a domain name (hereinafter briefly referred to as "host"), and a URL. The protection device determines the data type of the key data based on the field in which the key data is obtained.

For example, if the protection device obtains key data "111.112.113.114" from a source IP address field or a destination IP address field of an IP packet header, a data type of the key data "111.112.113.114" is IP. If the protection device obtains key data "www.baidu.com" from a host field in an HTTP packet header, a data type of the key data "www.baidu.com" is host. If the protection device obtains key data "https://111.122.133.144/index.html" from a host field and a Request URI field in an HTTP packet header, a data type of the key data "https://111.122.133.144/index-.html" is URL. A relationship between a data type of key data and an obtained field is not limited to the foregoing enumerated types, and the foregoing example is merely an example for description.

When a data type is added to each entry in the local statistical table shown in Table 3 on the basis of Table 1, Table 3 is an example of the local statistical table of the protection device in this embodiment. Optionally, a data type in Table 3 may be replaced with a data type indicator. For example, URL is represented by a number 1 or a letter A, IP is represented by a number 2 or a letter B, and host is represented by a number 3 or a letter C.

TABLE 3

| Data type | Key data | Count value |
|---|---|---|
| URL | https://111.122.133.144/index.html | 2021 |
| IP | 111.112.113.114 | 2001 |
| host | www.baidu.coM | 1997 |

Correspondingly, the local masking result obtained by the protection device in step 410 also explicitly or implicitly indicates the data type. Explicit indication means that each entry in the local masking result includes a data type or a data type indicator in plaintext. Implicit indication means that each entry in the local masking result does not include a data type or a data type indicator in plaintext.

When the local masking result is presented by using the local masking table, and the local masking table explicitly indicates a data type, the local masking table generated by the protection device is shown in Table 4.

TABLE 4

| Data type | Masked data | Count value |
|---|---|---|
| URL | DAB19E82E1F9A681EE73346D3E7A575E | 2021 |
| IP | 59C7918EC1CC9A0C4DFED374468490F2 | 2001 |
| host | DAB19E82E1F9A681EE73346D3E7A575E | 1997 |

Optionally, the protection device carries a data type in the local masking result implicitly.

One possible way to implicitly carry a data type in the local masking result is to indicate data types with masked data of different lengths. For example, for key data whose data type is URL in the local masking result, a first hash algorithm is used to generate a 20-bit hash value; for key data whose data type is IP in the local masking result, a second hash algorithm is used to generate a 25-bit hash value; and for key data whose data type is host in the local masking result, a third hash algorithm is used to generate a 30-bit hash value. When the local masking result is presented by using the local masking table, and the local masking table implicitly carries a data type, the local masking table generated by the protection device is shown in Table 5. Compared with the explicit indication manner, the implicit indication manner in which the amount of data of each entry in the local masking result is smaller can reduce an amount of data of each entry in the local masking result, and save transmission bandwidth between the protection device and the security service server.

TABLE 5

| Masked data | Count value |
|---|---|
| DAB19E82E1F9A681EE73 | 2021 |
| 59C7918EC1CC9A0C4DFED3744 | 2001 |
| DAB19E82E1F9A681EE73346D3E7A57 | 1997 |

Figure 6:
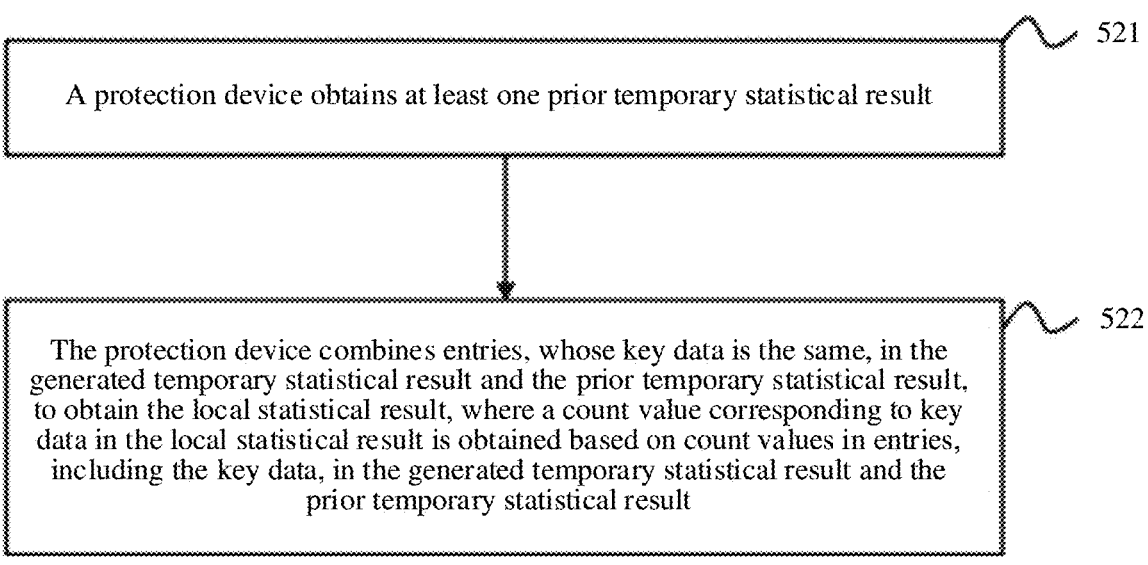
FIG. 6 is a flowchart of a specific process in which a protection device determines a local statistical result based on a plurality of temporary statistical results according to an embodiment of this application.

There are a plurality of specific manners in which the protection device obtains the local statistical result based on the plurality of pieces of key data obtained from the first traffic, and the manners are not limited to the following two manners. Manner 1 describes a case that the protection device obtains the local statistical result based on traffic in a single time segment. Manner 2 describes a case that the protection device obtains the local statistical result based on traffic in a plurality of time segments. It should be noted that the administrator of the protection device may configure a manner of obtaining the local statistical result by using a command line of the protection device, or the security service server may remotely configure a manner of obtaining the local statistical result by the protection device. The process shown in FIG. 5 or FIG. 6 is an optional implementation of step 400 in FIG. 4.

In the following embodiments, for the purpose of intuitive and clear description, a local statistical result is described by using a local statistical table as an example, and a local masking result is described by using a local masking table as an example.

Manner 1

FIG. 5 is a flowchart of a specific process in which a protection device obtains a local statistical result according to an embodiment of this application. The process includes step boo to step 520.

Step 500: The protection device obtains a plurality of pieces of key data from first traffic based on a plurality of specified fields. Each of the plurality of pieces of key data is content of a specified field of a packet in the first traffic.

For example, the protection device pre-stores a plurality of rules used to obtain key data, where each rule includes information such as a protocol type, a specified field, and a data type corresponding to the specified field. For each packet in traffic, the protection device uses the rules in sequence to attempt to obtain key data. For example, the protection device first matches packets based on protocol types in the rules. If a protocol type of a packet matches a protocol type in a rule, the protection device obtains content of a specified field in the rule in the packet. If the content of the specified field can be obtained successfully, the obtained data is used as the key data.

Optionally, when the entry of the local statistical table further includes a data type, the protection device determines the data type of the key data based on a specified field in which the key data is located when the key data is obtained, that is, the data type of the key data corresponds to the specified field in which the key data is located when the key data is obtained. Optionally, a data type corresponding to a field is set in the foregoing rules.

As listed in the example in the foregoing embodiments, the first traffic is traffic that passes through the protection device 100 in FIG. 1 in the first time segment, for example, from 00:00 on Jan. 10, 2020 to 00:00 on Jan. 11, 2020.

For a first packet in the first traffic, the protection device obtains content 111.112.113.114 of a source IP address field or a destination IP address field in an IP packet header of the first packet, to obtain first key data 111.112.113.114 whose data type is IP.

For a second packet in the first traffic, the protection device obtains content "www.baidu.com" of a field . . . of the second packet, to obtain second key data "www.baidu.com" whose data type is host.

For a third packet in the first traffic, the protection device obtains content "https://111.122.133.144/index.html" of a field . . . of the third packet, to obtain key data "https://111.122.133.144/index.html" whose data type is URL.

In a similar manner, the protection device obtains a large amount of key data in the first traffic. Optionally, the protection device further obtains a data type corresponding to each piece of key data.

Step 510: The protection device generates a corresponding entry for each piece of key data, to obtain a plurality of entries, and records, in the entry corresponding to each piece of key data, a count value corresponding to the key data, where the count value corresponding to the key data is a quantity of times that the key data is identified in the first time segment.

A simplified example is taken as follows: The protection device identifies the key data https://111.122.133.144/index-.html from the field corresponding to URL for a total of 2021 times in the traffic that passes through the protection device 100 in FIG. 1 from 00:00 on Jan. 10, 2020 to 00:00 on Jan. 11, 2020. In other words, the corresponding key data https://111.122.133.144/index.html whose data type is URL is identified by the protection device for 2021 times. The protection device generates a first entry for a first key data group, where the first entry is (URL, https://111.122.133.144/index.html, 2021).

The protection device identifies the key data 111.112.113.114 from the field corresponding to IP for a total of 2001 times in the traffic that passes through the protection device 100 in FIG. 1 from 00:00 on Jan. 10, 2020 to 00:00 on Jan. 11, 2020. In other words, the corresponding key data 111.112.113.114 whose data type is IP is identified by the protection device for 2021 times. The protection device generates a second entry for a second key data group, where the second entry is (IP, 111.112.113.114, 2001).

The protection device identifies the key data www.baidu.com from the field corresponding to host for a total of 1997 times in the traffic that passes through the protection device 100 in FIG. 1 from 00:00 on Jan. 10, 2020 to 00:00 on Jan. 11, 2020. In other words, the corresponding key data www.baidu.com whose data type is host is identified by the protection device for 1997 times. The protection device generates a third entry for a third key data group, where the third entry is (host, www.baidu.com, 1997).

Step 520: The protection device selects a predetermined quantity or proportion of entries from the plurality of entries based on the count values of the plurality of entries, generates a temporary statistical result, and determines the local statistical result based on the generated temporary statistical result.

There is a high probability that traffic that frequently occurs in overall traffic is trusted traffic, and there is a low probability that rare traffic is trusted traffic. Because the local statistical table should reflect the frequent key data in the traffic, an optional manner is that, the protection device selects, based on an order of count values from high to low, a predetermined quantity or proportion of entries from the plurality of entries generated in step 510, to generate a temporary statistical table.

For example, an entry selection rule is to select first 10 entries with high count values. It is assumed that the protection device generates 100 entries in total based on the first traffic, and after sorting the 100 entries based on count values in the entries, the protection device selects first 10 entries, generates a temporary statistical table including the selected 10 entries, and uses the generated temporary statistical table as a local statistical table.

For another example, an entry selection rule is to select first 15% entries with high count values. It is assumed that the protection device generates 100 entries in total based on the first traffic, and the protection device selects first 15 entries based on count values in the entries, generates a temporary statistical table including the selected 15 entries, and uses the generated temporary statistical table as a local statistical table.

Alternatively, the protection device selects an entry whose count value is greater than a specified threshold based on configuration information, and generates a temporary statistical table.

In this embodiment, a possible implementation of step 520 is that the protection device uses the generated temporary statistical result as the local statistical result.

Manner 2

Implementations of step 500 and step 510 in the manner 2 are similar to those in the manner 1, and a difference between the manner 2 and the manner 1 in an implementation of step 520. Burst traffic in a single period is not likely to be trusted traffic, but may be caused by an attack. To avoid a case that key data in occasional burst traffic is added to the local statistics table by the protection device, to interfere with subsequent identification of trusted traffic or interfere with determining the global masking table by the security service server, the protection device generates a local statistics table based on traffic in a plurality of periods of time.

FIG. 6 is a flowchart of a specific implementation of determining a local statistical result based on a plurality of temporary statistical results. That is to say, FIG. 6 describes an implementation of step 520 in FIG. 5, including step 521 and step 522.

Step 521: The protection device obtains at least one prior temporary statistical result. Each prior temporary statistical result is obtained based on traffic that passes, in a time segment before the first time segment, through the network location in which the protection device is applied. In other words, for a plurality of time segments before the first time segment, the protection device uses the method described in step 500 to step 520 to calculate a temporary statistical result for each of the plurality of periods of time.

Step 522: The protection device combines entries, whose key data is the same, in the generated temporary statistical result and the prior temporary statistical result, to obtain the local statistical result, where a count value corresponding to key data in the local statistical result is obtained based on count values in entries, including the key data, in the generated temporary statistical result and the prior temporary statistical result.

Based on the method shown in FIG. 6, the protection device determines frequent key data in the traffic based on traffic statistical data in a plurality of periods of time. The key data reflects characteristics of normal traffic, and is key data that should really be added to the local statistical table. In this way, frequent key data in traffic bursting accidentally in a short period is not add to the local statistics table.

For example, the protection device generates a temporary statistical table for traffic in each time segment of traffic in M periods of time by using the method mentioned in the manner 1, to obtain M temporary statistical tables. The protection device reserves the M temporary statistics tables in a buffer. When the quantity of temporary statistics tables in the buffer is less than M, if the protection device generates a new temporary statistics table, the new temporary statistics table is stored in the buffer. When M temporary statistics tables exist in the buffer, the protection device deletes a temporary statistics table corresponding to an earliest time segment from the buffer and then stores a new generated temporary statistics table. A format of each entry in the temporary statistics table is (type, key, ucount). A type field is used to distinguish types of key data, such as a domain name and a URL. A key field is used to describe content of the key data. For example, when type is a domain name, the field is "www.baidu.coM"; and count indicates a count value of occurrence of the key data in the entry in the traffic of the time segment based on which the protection device generates the temporary statistics table. For example, an entry (host, www.baidu.coM, 2020) indicates that the domain name "www.baidu.coM" occurs for 2020 times in traffic corresponding to a time segment.

The protection device analyzes the M temporary statistical tables in the buffer, and outputs a local statistical table, where M is a natural number greater than or equal to 2. A format of each entry in the local statistics table is (type, key, pcount). First two fields are the same as those in the temporary statistics table, and a third field is a result of collecting statistics on count fields in all entries with the same type and key in the M temporary tables. When the quantity of lists in the buffer is less than M, the output local list is empty; otherwise, the following formula (1) and formula (2) are used to collect statistics and output the local list.

$$P\,\text{count}\,(\text{Key}) = \left(\frac{2c}{M}\right) * \sum_{i=0}^{M} (\text{Count}\,(\text{key}_i) * I/A\,\text{count}) \qquad \text{formula (1)}$$

$$A\,\text{count} = \sum_{j=0}^{n} \text{Count}_j \qquad \text{formula (2)}$$

I is a natural number, Acount is a sum of count values of all entries in all temporary statistical tables (that is, the prior temporary statistical table and the generated temporary statistical table), n is a quantity of all the entries in the temporary statistical tables, Pcount(Key) is a count value of key data (key) in the local statistical table, M is a quantity of all the temporary statistical tables, c is a quantity of temporary statistical tables having entries including the key data (key) (which may also be understood as a quantity of temporary statistical tables where the key data (key) occurs), and Count(key$_i$) is a count value in an entry that is in an $i^{th}$ temporary statistical table and that includes the key data (key).

When the value of I is 10000, a meaning of Count(key$_i$)* 10000/Acount in the foregoing formula (1) is a permyriad ratio of a count value of an entry that includes the key data (key) in the $i^{th}$ temporary table to the count values of all the entries (which may also be understood as a permyriad ratio of an occurrence frequency of the key data (key) in an $i^{th}$ list A to a sum of occurrence frequencies of all key data in the list A).

In this embodiment of this application, a parameter c is introduced to avoid a case that key data in malicious traffic that suddenly occurs in a time segment and whose data volume is very high is considered as key data that can be used to identify trusted traffic, and consequently the protection device skips performing additional security detection on the malicious traffic. In addition, the local statistical table is obtained through a plurality of temporary lists to reserve a detection time window (a length of the time window is M/2 periods of time in the list A) for the protection device to perform detection. Traffic that is still not identified as malicious traffic and processed after the reserved detection time window is exceeded is considered as non-malicious traffic by default.

Optionally, the local statistical table includes new entries respectively corresponding to all entry groups. Alternatively, the protection device selects, based on an order of count values from high to low, a predetermined quantity or predetermined proportion of new entries with high count values, and generates a local statistical table including the selected new entries.

Figure 7:
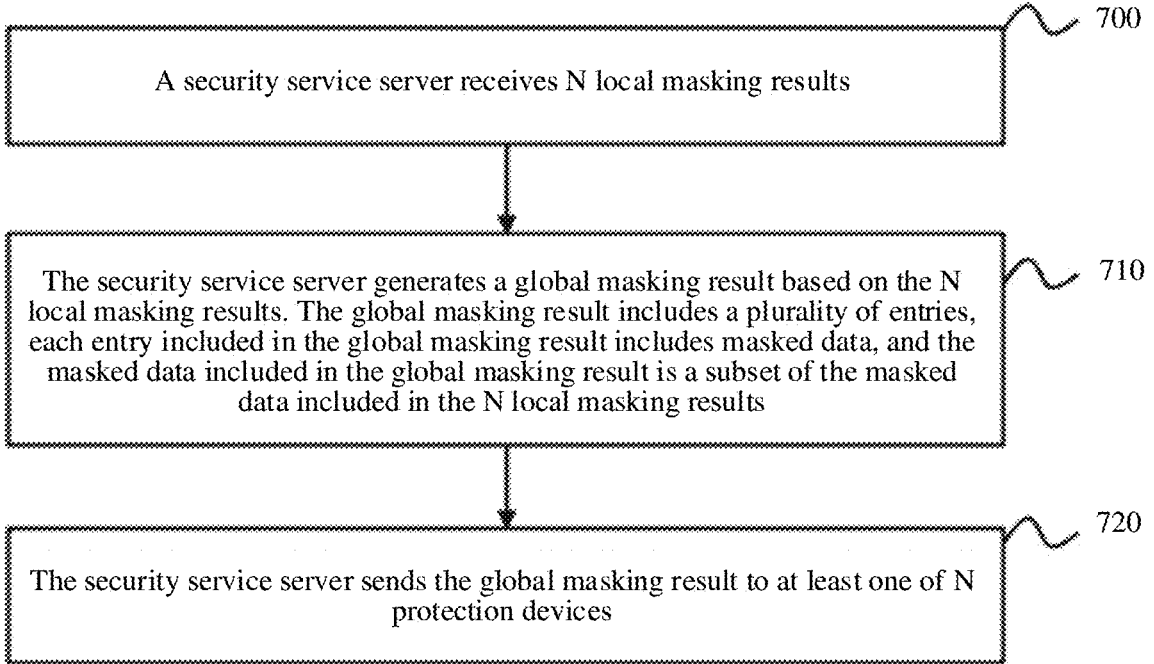
FIG. 7 is a flowchart of a traffic processing method according to an embodiment of this application.

FIG. 7 is a flowchart of a traffic processing method according to an embodiment of this application. FIG. 7 describes a traffic processing solution from a perspective of a security service server. The traffic processing method in FIG. 7 includes step 700 to step 720. Optionally, the security service server in FIG. 7 is the security service server in FIG. 2 or FIG. 3.

Step 700: The security service server receives N local masking results. Each of the N local masking results is from one protection device (in other words, the N local masking results are from N protection devices respectively), and N is a natural number greater than or equal to 2. Each of the N local masking results includes a plurality of entries, and each of the plurality of entries includes masked data and a corresponding count value.

With reference to the descriptions of step 420 in FIG. 2, FIG. 3, and FIG. 4, after generating a local masking result by using the method described in FIG. 4, protection devices such as the protection device 100 and the protection device 101 in FIG. 2 or FIG. 3 send respective generated local masking results to the security service server. Optionally, protection devices synchronously send local masking results to the security service server based on a predetermined period, or protection devices separately send local masking results to the security service server.

After receiving the N local masking results, the security service server correspondingly stores identifiers of the protection devices and the local masking results sent by the protection devices, to make it convenient to subsequently manage the local masking results and delete an expired local masking result, thereby saving storage space.

Step 710: The security service server generates a global masking result based on the N local masking results. The global masking result includes a plurality of entries, each entry included in the global masking result includes masked data, and the masked data included in the global masking result is a subset of the masked data included in the N local masking results.

Optionally, to enable the global masking table to truly reflect a latest traffic feature, when generating the global masking table, the security service server selects a local masking result recently sent by each protection device. The security service server selects, based on the N local masking results, masked data occurring frequently and widely, and adds the masked data to the global masking table. An implementation of step 710 includes but is not limited to one manner described in FIG. 8.

Step 720: The security service server sends the global masking result to a protection device.

Optionally, the protection device that receives the global masking result in step 720 is one of the protection devices that send the local masking results in step 700, or another protection device that has not sent any local masking result. From another perspective, the protection device that sends the local masking table to the security service server and the protection device that receives the global masking table sent by the security service server may be a same protection device, or may be different protection devices. For example, with reference to the scenario shown in FIG. 2 or FIG. 3, the protection device 100 and another protection device that is not shown in the figure send local masking tables to the security service server, and the security service server sends a global masking table to the protection device 100; or the protection device 100 and another protection device that is not shown in the figure send local masking tables to the security service server, and the security service server sends a global masking table to the protection device 101.

In this embodiment of this application, the security service server obtains an analysis result of masked data from a plurality of protection devices, and shares the analysis result with each protection device, thereby expanding data that is used to configure an identification policy, so that the protection device can identify more trusted traffic, thereby further reducing an amount of data required to perform additional security detection.

The security service server periodically executes the method shown in FIG. 7 to determine the global masking result. Optionally, the period for the security service server to determine the global masking table and the period for the protection device to determine the local masking table in step 400 are the same as. For example, each protection device is configured to execute the method shown in FIG. 4 once a day. For example, each protection device generates a local masking table at 23:00 every day and sends the generated local masking table to the security service server, and the security service server generates a global masking table at 24:00 every day based on the local masking table recently sent by each protection device. Alternatively, the period for the security service server to determine the global masking table and the period for the protection device to determine the local masking table in step 400 are different. For example, each protection device is configured to execute the method shown in FIG. 4 once a day, to generate a local masking table at 23:00 every day, and send the generated local masking table to the security service server. The security service server generates a global masking table every 12 or 30 hours based on the local masking table recently sent by each protection device.

to improve identification accuracy of identifying, based on the key data, the data of the resource accessed by the traffic, and avoid misidentification, the entry of the local statistical table sent by the protection device further includes, on the basis of the key data and the count value, the data type of the key data in the entry. Correspondingly, when performing step 710, the security service server determines, with reference to both the key data and the data type, the key data to be added to the global masking table.

In the following embodiments, for the purpose of intuitive and clear description, a global masking result is described by using a global masking table as an example.

FIG. 8 is a flowchart of a method for generating a global masking result based on a plurality of local masking results according to an embodiment of this application. The process shown in FIG. 8 is an implementation of step 710 in FIG. 7, including step 800 to step 820.

Step 800: The security service server combines entries that are in the N local masking results and whose masked data is the same to obtain an intermediate masking result, where the intermediate masking result includes a plurality of entries, each entry included in the intermediate masking result includes masked data and a corresponding count value, and the count value corresponding to the masked data in each entry included in the intermediate masking result is obtained based on count values in entries that are in the N local masking results and that include the masked data; and Step 810: The security service server selects at least one entry from the intermediate masking result based on the count values in the entries in the intermediate masking result, deletes the count value in the selected entry, and then obtains the global masking result based on the entry whose count value is deleted.

Optionally, in a process in which the security service server generates the global masking result based on the local masking tables, to improve accuracy, the security service server generates an intermediate masking result with reference to a data type. That is to say, the security service server combines entries that are in the N local masking results and that have same masked data and a same data type, to obtain an intermediate masking result. The count value corresponding to the masked data in each entry included in the intermediate masking result is a weighted sum of the count values in the entries that are in the N local masking results and that include the masked data, and the weighted sum is positively correlated with a sum of the count values of the entries that are in the N local masking results and that include the masked data, is positively correlated with a quantity of the entries that are in the N local masking results and that include the masked data, and is negatively correlated with N. In other words, the count value increases as the sum of the count values in the entries that are in the N local masking results and that include the masked data increases, increases as the quantity of the entries that are in the N local masking results and that include the masked data increases, and decreases as a value of N increases.

A format of each entry in an intermediate masking table is (type, hash_key, Ccount). A type field is used to distinguish types of masked data, such as a domain name and a URL. A hash_key field indicates masked data, for example, DAB19E82E1F9A681EE73346D3E7A575E. count indicates a count value of masked data in the entry.

A formula (3) is used to calculate a count value of each entry in the intermediate masking table.

$$C\,\text{count(hash\_key)} = \left(\frac{kc}{N}\right) * \sum_{i=0}^{N} P\,\text{count(hash\_key}_i) \qquad \text{formula (3)}$$

hash_key is masked data included in a first entry in the intermediate masking result, Ccount(hash_key) is a count value corresponding to the masked data included in the first entry, i is an identifier of a local masking result (or i may be understood as a number of a protection device), $$\sum_{i=0}^{N} P\,\text{count(hash\_key}_i)$$

is a sum of count values in all entries that are in the N local masking results and that include the masked data hash_key, and c is a quantity of times that the masked data hash_key occurs in the N local masking results. c is introduced to avoid a case that exclusive key data in traffic of a single protection device is shared with another protection device and consequently performance of the another protection device is affected.

k is an optional constant in the formula (3). The constant k is used to control a shielding ratio of the exclusive key data of the protection device. The value of k is a natural number ranging from 1 to 10. The default value 6 is recommended. A case that the value of k is 1 is actually equivalent to omitting the constant k.

Optionally, the security service server obtains, based on order of Ccount from high to low from the intermediate masking table, a predetermined quantity or predetermined proportion of entries with high count values as a global masking table. For example, after reserving first 50% entries and discarding last 50% entries in the intermediate masking table, the security service server discards count value Ccount fields in the reserved entries, to obtain a global masking table. Alternatively, the security service server selects an entry whose count value is greater than a specified threshold from the intermediate masking table based on configuration information, and generates a global masking table.

FIG. 9 is a flowchart of performing, by a protection device, traffic identification based on a global masking table sent by a security service server. The process shown in FIG. 9 includes step 900 to step 940. Optionally, the protection device that executes the process shown in FIG. 9 is the protection device shown in FIG. 2 and FIG. 4 to FIG. 6. FIG. 9 illustrates how a protection device applies a global masking table by using a protection device in in-path deployment as an example. It is understandable that the protection device in in-path deployment forwards a packet or performs additional security detection based on an identification result of trusted traffic. If the protection device is a protection device in off-path deployment, the forwarding or blocking of the packet is replaced with another function, for example, recording a log or further analyzing the identification result of the trusted traffic.

Step 900: A protection device receives a global masking result sent by a security service server.

Optionally, the global masking result is obtained by analyzing local masking results from at least two protection devices by the security service server. The global masking result includes at least one entry, and each entry in the global masking result includes at least masked data. Optionally, each entry in the global masking table indicates a data type explicitly or implicitly.

After receiving the global masking result, the protection device performs, based on the global masking result, processing shown in step 910 to step 940 on subsequent traffic in a network location in which the protection device is applied. It should be noted that, because the protection device continuously reports the local masking result and receives the global masking result, this embodiment of this application does not limit a sequence of performing, by the protection device, the process shown in FIG. 9 and the process shown in FIG. 4. For example, the protection device performs, in parallel in a first period, the process shown in FIG. 9 and the process shown in FIG. 4 on the traffic based on the previously received global masked data, to generate and report a local masking table in the first period.

In addition, the protection device performs similar processing on a plurality of packets in the traffic. For brevity of description, only a processing process of one packet (a first packet is used as an example) in the subsequent traffic is used as an example in step 910 to step 940 for description. For example, step 910 to step 930 and a branch described in step 940 are performed on one packet (packet A), while step 910 to step 930 and a branch described in step 950 are performed on another packet (packet B).

Step 910: The protection device obtains first key data from a first packet.

The first packet is a packet in traffic that passes, in a second time segment, through the network location in which the protection device is applied, and the second time segment is a time segment after the first time segment. A process in which the protection device obtains the key data from the first packet is similar to step 400 in FIG. 4. For details, refer to related descriptions of step 400 in FIG. 4. Details are not described herein again.

To be distinguished from key data in each entry, the key data obtained from the first packet is referred to as first key data herein.

Optionally, to improve accuracy of identifying trusted traffic, when obtaining the first key data, the protection device further determines, based on a field based on which the first key data is obtained, a data type of the first key data. The first key data is content of a first specified field in the first packet, and the first key data corresponds to a first data type.

Step 920: The protection device performs masking processing on the key data obtained in step 910, to obtain masked data. To be distinguished from masked data in each entry, the masked data obtained by performing masking processing on the first key data is referred to as first masked data herein.

Step 930: The protection device determines whether a first target entry exists in the global masking result. Masked data included in the first target entry is the same as the first masked data.

Optionally, if trusted traffic is identified with reference to a data type, the masked data included in the first target entry is the same as the first masked data, and the data type included in the first target entry is the same as the first data type.

If the first target entry exists in the global masking table, step 940 is performed. If the first target entry does not exist in the global masking table, step 950 is performed.

Step 940: The protection device skips performing additional security detection on the first packet.

If masked data obtained based on key data in a subsequent packet is the same as the masked data in the global masking result, it indicates that the packet belongs to trusted traffic, and the protection device skips performing additional security detection on the first packet, thereby improving processing performance.

Step 950: The protection device performs additional security detection on the first packet.

Optionally, because the local statistical result generated by the protection device in step 400 in FIG. 4 reflects characteristics of the traffic in the network location in which the protection device is applied, the protection device can further improve an effect of identifying trusted traffic with reference to the local statistical result and the global masking result.

FIG. 10 is a flowchart of performing, by a protection device, traffic identification by combining a local statistical result and a global masking result. Step woo and step 1010 in FIG. 10 are respectively similar to step 900 and step 910 in FIG. 9, and step 1040 to step 1070 are respectively similar to step 920 to step 950. Therefore, for these steps, refer to related descriptions in FIG. 9. Details are not described herein again.

Step 1000: A protection device receives a global masking result sent by a security service server.

Step 1010: The protection device obtains first key data from a first packet.

Optionally, the protection device further obtains a first data type based on a field of the obtained first key data.

Step 1020: The protection device determines whether a second target entry exists in a local statistical result. Key data included in the second target entry is the same as the first key data.

Optionally, if trusted traffic is identified with reference to a data type, the key data included in the second target entry is the same as the first key data, and the data type included in the second target entry is the same as the first data type.

For a process of generating the local statistical table, refer to descriptions of step 400 and step 410 in FIG. 4, and details are not described herein again.

If the second target entry exists in the local statistical table, step 1030 is performed; otherwise, step 1040 is performed.

Step 1030: The protection device skips performing additional security detection on the first packet.

Step 1040: The protection device performs masking processing on the first key data obtained in step 1010, to obtain first masked data.

Step 1050: The protection device determines whether a first target entry exists in the global masking result. Masked data included in the first target entry is the same as the first masked data, and a data type included in the first target entry is the same as the first data type.

If the first target entry exists in the global masking result, step 1030 is performed. If the first target entry does not exist in the global masking result, step 1060 is performed.

Step 1060: The protection device performs additional security detection on the first packet.

Figure 11:
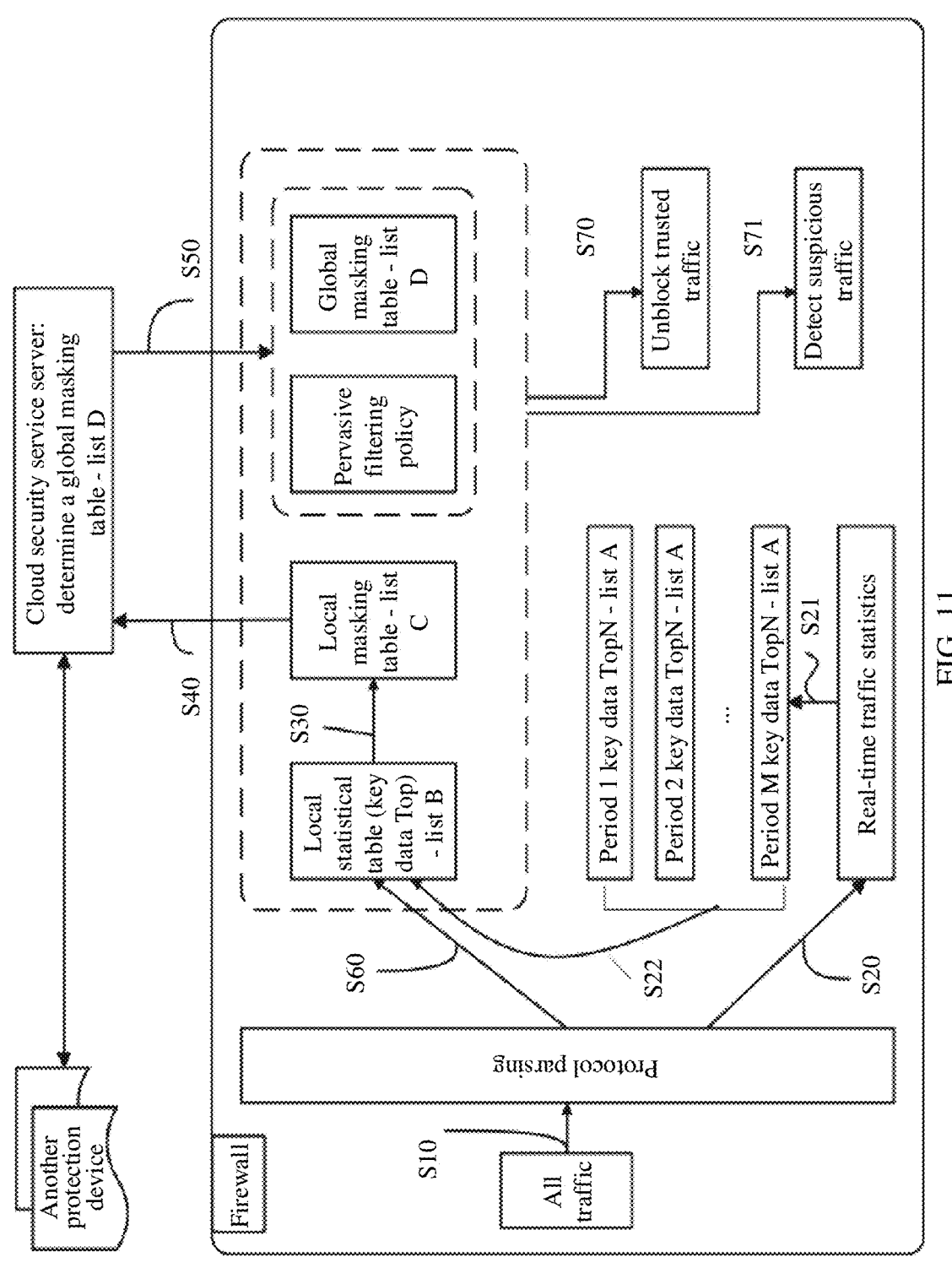
FIG. 11 is a schematic diagram of a traffic processing system according to an embodiment of this application.

FIG. 11 is a schematic diagram of a traffic processing system according to an embodiment of this application. The traffic processing system provided in embodiments of this application includes a security service server and at least two protection devices. In FIG. 11, a firewall is used as an example to describe a protection device, and a cloud-based security service server (briefly referred to as a cloud security service server in this embodiment) is used as an example to describe a security service server. Optionally, in FIG. 11, the firewall is the protection device 100 or the protection device 101 in in-path deployment in FIG. 2, and the cloud security service server is the security service server 200 in FIG. 2. Obviously, the firewall in the traffic processing system shown in FIG. 11 may also be replaced with the protection device in off-path deployment shown in FIG. 3, for example, a CIS. When the firewall is replaced with the protection device in off-path deployment, step S70 or S71 in FIG. 11 is replaced with another action such as log recording or further analysis.

S10: A firewall performs protocol parsing on full traffic to be detected to obtain key data in the traffic. The obtained key data includes but is not limited to IP+port, a domain name, a URL, and an email sender.

S20: The firewall periodically collects statistics on the key data obtained by performing parsing in S10, to obtain a temporary statistical table corresponding to each period, where the temporary statistical table is recorded as a list A. Optionally, an administrator presets, by using a command line or a graphical user interface (GUI), duration of the period or a quantity of entries included in the temporary statistical table. A format of each entry in the list A is (type, key, ucount).

For example, an entry (host, www.baidu.com, 2020) indicates that the firewall identifies the domain name "www.baidu.com" for 2020 times in traffic passing through the firewall in a current statistical period.

For a detailed process of obtaining the list A, refer to the embodiment described in FIG. 4, FIG. 5, or FIG. 6. A format of the list A is shown in Table 3.

S21: The firewall stores the list A generated in S20 in a buffer of a device. M lists A are stored in the buffer. When the quantity of lists A in the buffer is less than M, the firewall directly stores a newly generated list A in the buffer. When the quantity of lists A in the buffer is M, the firewall deletes an earliest list A and then stores a currently newly generated list A.

S22: The firewall collects statistics on M lists A in the buffer, and outputs a local statistical table, where the local statistical table is recorded as a list B. A format of each entry in the list B is (type, key, pcount). Meanings of first two fields are the same as those in the list A, and a third field is a result of collecting statistics on count fields in all entries with the same type and key in the M lists A. When the quantity of lists in the buffer is less than M, the list B output by the firewall is empty; otherwise, the list B is determined by using the method, the formula (1), and the formula (2) in the embodiment described in FIG. 6. A format of the list B is shown in Table 3.

Figure 12:
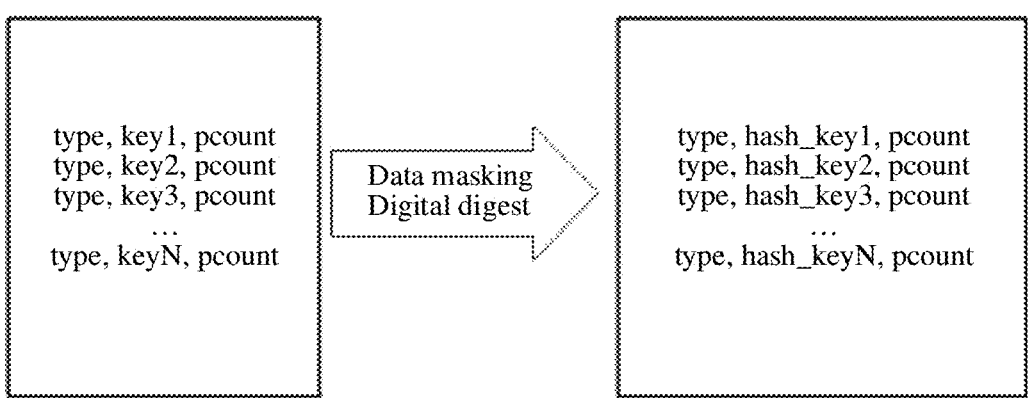
FIG. 12 is a schematic diagram of a masking process according to an embodiment of this application.

S30: The firewall performs masking processing on key data in the list B obtained in S22, and outputs a local masking table, where the local masking table is recorded as a list C. Optionally, in this embodiment, the firewall performs masking processing on key data in each entry of the list B in a digital digest manner. FIG. 12 is a schematic diagram of a masking process. A format of the list C is shown in Table 4.

A format of an entry in the list C is (type, hash_key, pcount), where type and pcount in an entry of the list C are respectively the same as type and pcount in an entry of the list B before masking; and hash_key is a digital digest of key data (key) in an entry of the list B before masking.

For example, before masking, the list B has an entry (host, www.baidu.com, 1983), and a corresponding entry obtained through masking is (host, DAB19E82E1F9A681EF7334-6D3E7A575E, 1983).

S40: The firewall sends the list C to a cloud security service server.

The cloud security service server classifies, based on data types, lists C uploaded by all firewall devices to the cloud security service server, then performs statistical sorting, and outputs a global masking table based on a fixed policy. The global masking table is recorded as a list D. A format of an entry of the list D is (type, hash_key). Meanings of type and hash_key fields in an entry of the list D are the same as those in the list C.

The list D is determined with reference to the method and the formula (3) in the embodiment described in FIG. 8.

Optionally, the cloud security service server generates several intermediate lists (not shown in FIG. 12) in a process of determining the list D. A first intermediate masking table is recorded as a list E. A format of an entry in the list E is (type, hash_key, Ccount). Meanings of type and hash_key fields of an entry in the list E are respectively the same as those of type and hash_key of an entry in the list C, and a Ccount field is calculated by using the formula (3). The list E is shown in Table 6.

TABLE 6

| Data type | Masked data | Count value |
| --- | --- | --- |
| host | DAB19E82E1F9A681EE73346D3E7A575E | 19970701 |
| IP | 59C7918EC1CC9A0C4DFED374468490F2 | 20010911 |
| URL | 339D26C4242AABE3AF75739FCD7E7F14 | 20210220 |
| host | 443A258B43FCE9E4B3E276E0753147C7 | 19830620 |

The cloud security service server sorts generated intermediate lists E in descending order of Ccount to generate a list F, deletes, from the tail of the list F, records whose quantity is 10% of the total quantity of records in the list F to obtain a list G, discards Ccount fields of all records in the list G, and reserves type and hash_key fields to obtain a list H. The list F is shown in Table 7. The list G is shown in Table 8. The list H is shown in Table 9.

TABLE 7

| Data type | Masked data | Count value |
| --- | --- | --- |
| URL | 339D26C4242AABE3AF75739FCD7E7F14 | 20210220 |
| IP | 59C7918EC1CC9A0C4DFED374468490F2 | 20010911 |
| host | DAB19E82E1F9A681EE73346D3E7A575E | 19970701 |
| host | 443A258B43FCE9E4B3E276E0753147C7 | 19830620 |

TABLE 8

| Data type | Masked data | Count value |
| --- | --- | --- |
| URL | 339D26C4242AABE3AF75739FCD7E7F14 | 20210220 |
| IP | 59C7918EC1CC9A0C4DFED374468490F2 | 20010911 |
| host | DAB19E82E1F9A681EE73346D3E7A575E | 19970701 |

TABLE 9

| Data type | Masked data |
| --- | --- |
| URL | 339D26C4242AABE3AF75739FCD7E7F14 |
| IP | 59C7918EC1CC9A0C4DFED374468490F2 |
| host | DAB19E82E1F9A681EE73346D3E7A575E |

Optionally, the cloud security service server further stores a pre-configured pervasive identification policy, where the pervasive identification policy is configured based on experience. The pervasive identification policy includes a series of key data, which can also be represented by an entry in a format of (type, key). The cloud security service server calculates a digital digest of the key data in the pervasive traffic identification policy, and then matches the digital digest with hash_key in the list H. Data that is hit through matching is deleted from the list H, and the list D is a list obtained by deleting all matched hash_key.

If some firewalls cannot upload lists C due to a network reason or another reason, the lists C may not be uploaded, and the identification policy delivered by the cloud security service server is obtained only online or offline.

S50: The cloud security service server sends, to the firewall, a list D that is to be used as a global masking table.

Optionally, the cloud security service server further sends the pervasive identification policy or the key data in the pervasive identification policy to the firewall. Optionally, the cloud security service server sends the list D and the pervasive identification policy (the pervasive identification policy may be replaced with the key data in the pervasive identification policy) to the firewall separately, or the cloud security service server sends the sending list D and the pervasive identification policy (or the key data in the pervasive identification policy) to the firewall together.

After receiving the pervasive traffic identification policy (or key data in the pervasive traffic identification policy) and the list D, the firewall device deduplicates the list D by using the list B as the local statistical table. A process of deduplication is that the firewall calculates a digital digest of key data in each entry in the list B. If an entry including the digital digest exists in the list D, the entry including the digital digest is a duplicate entry, and the duplicate entry is deleted from the list D.

Optionally, if the cloud security service server sends the pervasive identification policy (or the key data in the pervasive identification policy) to the firewall, and if key data in a policy included in the pervasive identification policy is the same as the key data included in the list B, the policy is deleted from the pervasive identification policy.

S60: A function module configured to identify trusted traffic (briefly referred to as a traffic identification module) in the firewall performs, based on two types of identification policies, matching between packets obtained through protocol parsing. FIG. 1 shows a principle diagram of the firewall. The two types of identification policies in the firewall include a first type of identification policy and a second type of identification policy, where the first type of identification policy is an identification policy configured based on key data in the list B, and the second type of identification policy is an identification policy configured based on masked data in the list D. A function module configured to distinguish trusted traffic sends data obtained through parsing to the foregoing two types of identification policies in sequence. When the data obtained through parsing matches the identification policy configured based on the masked data in the list D, a digital digest of the data obtained through parsing is first calculated, and then matching is performed between the digital digest obtained through calculation and the second type of identification policy. If one policy hits traffic, the traffic is considered as being hit by the identification policy, and is identified as trusted traffic.

S70: The firewall directly unblocks traffic hit by the traffic identification module, and does not perform additional security detection.

S71: The firewall sends traffic that is not hit by the traffic identification module to an additional security detection module for malicious traffic detection.

The following describes, with reference to FIG. 13 to FIG. 16, a protection system, a security service system, and a network system including a protection system and a security service system that are provided in embodiments of this application.

Figure 13:
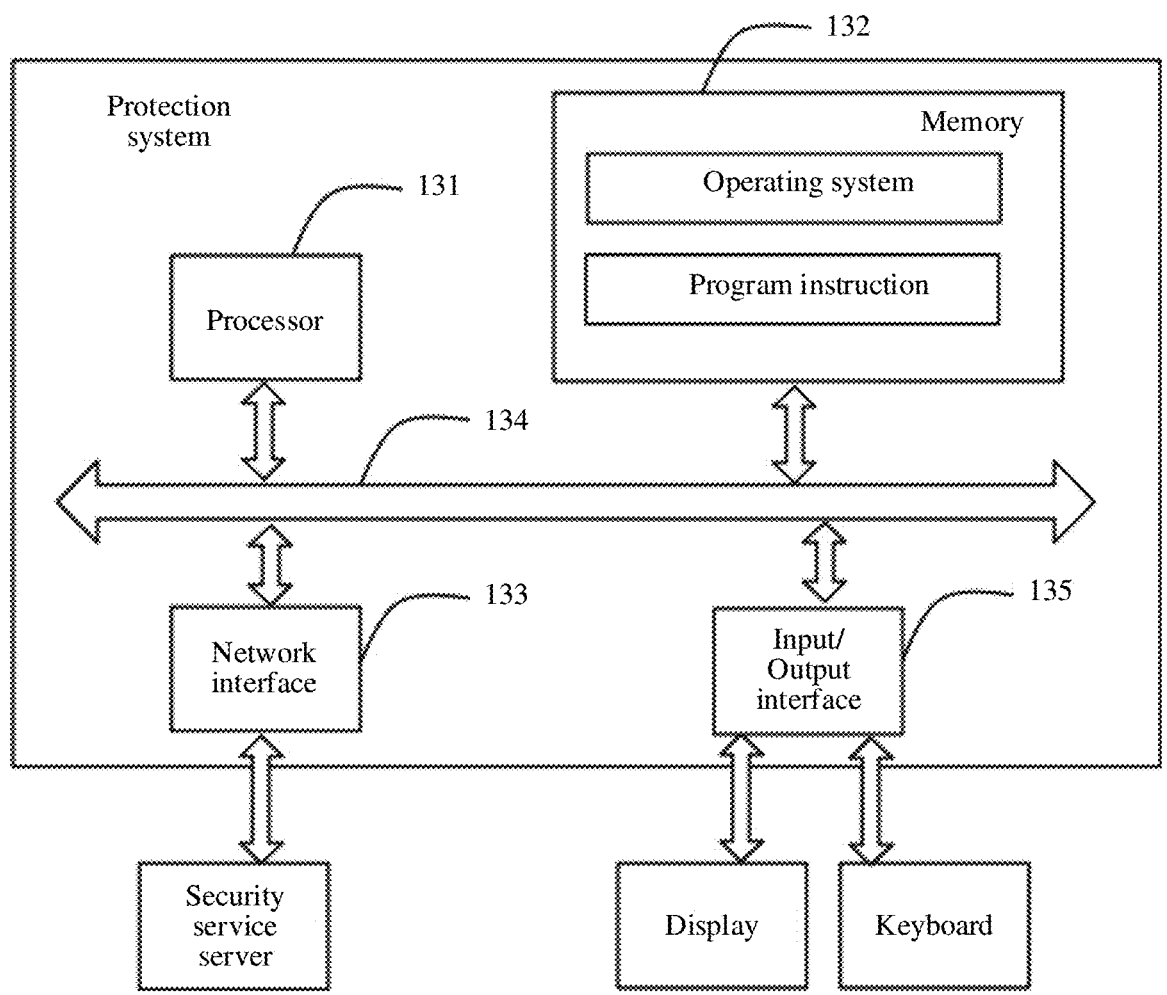
FIG. 13 is a schematic diagram of a structure of a protection system according to an embodiment of this application.

FIG. 13 is a schematic diagram of a structure of a protection system according to an embodiment of this application. The protection system having the structure shown in FIG. 13 implements a function of the protection device in the solution described in the foregoing embodiments. The protection system identifies, based on an identification policy configured based on key data, actual traffic that passes through a network location in which the protection system is actually applied. Optionally, the protection system shown in FIG. 13 is the protection device in FIG. 1, or the protection device in the application scenarios shown in FIG. 2 and FIG. 3, and performs a function of the protection device described in any embodiment shown in FIG. 4 to FIG. 6 or FIG. 9 to FIG. 11. Collaboration between the protection system shown in FIG. 13 and the security service server in the application scenarios shown in FIG. 2 and FIG. 3 can improve an effect of identifying trusted traffic by the protection system.

The protection system shown in FIG. 13 includes a memory 132 and at least one processor 131.

Optionally, the processor 131 implements the method in the foregoing embodiments by reading instructions stored in the memory 132, or the processor 131 may implement the method in the foregoing embodiments by executing instructions stored inside. When the processor 131 implements the method in the foregoing embodiments by reading the instructions stored in the memory 132, the memory 132 stores the instructions for implementing the method provided in the foregoing embodiments of this application.

Optionally, the at least one processor 131 is one or more CPUs or a single-core CPU, or may be a multi-core CPU.

The memory 132 includes but is not limited to a random access memory (RAM), a read-only memory (ROM), an erasable programmable read-only memory (EPROM), a flash memory, an optical memory, or the like. The memory 132 stores code of an operating system.

After the program instructions stored in the memory 132 are read by the at least one processor 131, the protection system performs the following operations:

obtaining a local statistical result, where the local statistical result indicates frequent key data in first traffic, the local statistical result includes a plurality of entries, each of the plurality of entries includes one piece of key data and a corresponding count value, and the first traffic is traffic that passes, in a first time segment, through a network location in which the protection system is applied; replacing the key data of each entry in the local statistical result with masked data corresponding to the key data, to obtain a local masking result; and sending the local masking result to a security service server.

Optionally, for a detailed process in which the processor 131 obtains the local statistical result, refer to descriptions in FIG. 4, FIG. 5, FIG. 6, and related embodiments, and details are not described herein again. For a detailed process in which the processor 131 obtains the local masking table and sends the local masking table, refer to descriptions in FIG. 4, FIG. 11, and related embodiments, and details are not described herein again.

Optionally, the protection system shown in FIG. 13 further includes a network interface 133. The network interface 133 may be a wired interface, for example, a fiber distributed data interface (FDDI) or a gigabit Ethernet (GE) interface. The network interface 133 may alternatively be a wireless interface. The network interface 133 is configured to: send a local masking result to the security service server in the scenario shown in FIG. 2 or FIG. 3 in the embodiments shown in FIG. 4 to FIG. 6 and FIG. 11, and receive a global masking result from the security service server in the embodiments shown in FIG. 9 to FIG. 11.

Optionally, after the protection system receives the global masking result from the security service server through the network interface 133, and after the program instructions in the memory 132 are read by the at least one processor 131, the protection system is further enabled to perform the following operations:

obtaining first key data from a first packet, and performing masking processing on the first key data to obtain first masked data, where the first packet is a packet in the traffic that passes through the network location in which the protection device is applied; and if a first target entry exists in the global masking result, skipping performing additional security detection on the first packet, where the first target entry includes the first masked data.

For a detailed process in which the processor 131 performs, based on the global masking result or the local statistical result, trusted identification on the packet in the traffic that passes through the network location in which the protection device is applied, refer to descriptions in the embodiments shown in FIG. 9 to FIG. 11, and details are not described herein again.

After the processor 131 reads the program instructions in the memory 132, for other functions that can be executed by the protection system, refer to the descriptions in the foregoing method embodiments.

Optionally, the protection system further includes a bus 134. The processor 131 and the memory 132 are usually connected to each other by using the bus 134, or may be connected to each other in another manner.

Optionally, the protection system further includes an input/output interface 135. The input/output interface 135 is configured to connect to an input device, and receive key data that is input by using the input device by a user or another device that can interact with the protection system. The input device includes, but is not limited to, a keyboard, a touchscreen, a microphone, and the like. The input/output interface 135 is further configured to connect to an output device, and output a result of identifying traffic by the processor 131, for example, an amount of data of trusted traffic, and a proportion of an amount of data of trusted traffic to an amount of data of total traffic. The output device includes, but is not limited to, a display, a printer, and the like.

The protection system provided in embodiments of this application is configured to perform the traffic processing method performed by the protection device provided in the foregoing method embodiments. The protection system collects statistics on the actual traffic passing through the network location in which the protection system is applied, to obtain frequent key data in the local actual traffic, masks the obtained key data, and sends the masked key data to the security service server, to make it convenient for the security service server to collect and analyze masked data from a plurality of protection devices and then determine globally frequent masked data. The globally frequent masked data helps further improve detection performance of more protection devices subsequently. The traffic processing solution provided in embodiments of this application can improve detection performance of a protection device while satisfying privacy security of a protected network.

Figure 14:
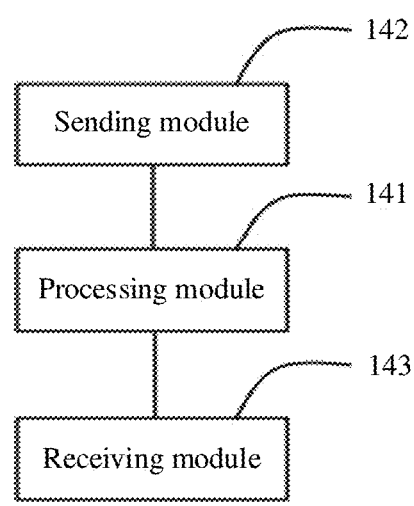
FIG. 14 is a schematic diagram of a structure of another protection system according to an embodiment of this application.

FIG. 14 is a schematic diagram of a structure of a protection system according to an embodiment of this application. The protection system having the structure shown in FIG. 14 implements a function of the protection device in the solution described in the foregoing embodiments. The protection system identifies, based on an identification policy configured based on key data, actual traffic that passes through a network location in which the protection system is actually applied. Optionally, the protection system shown in FIG. 14 is the protection device in FIG. 1, or the protection device in the application scenarios shown in FIG. 2 and FIG. 3, and performs a function of the protection device described in any embodiment shown in FIG. 4 to FIG. 6 or FIG. 9 to FIG. 11. Collaboration between the protection system shown in FIG. 14 and the security service server in the application scenarios shown in FIG. 2 and FIG. 3 can improve an effect of identifying trusted traffic by the protection system. The protection system 14 includes a processing module 141 and a sending module 142.

The processing module 141 is configured to obtain a local statistical result, where the local statistical result indicates frequent key data in first traffic, the local statistical result includes a plurality of entries, each of the plurality of entries includes one piece of key data and a corresponding count value, and the first traffic is traffic that passes, in a first time segment, through a network location in which the protection system is applied; and replace the key data of each entry in the local statistical result with masked data corresponding to the key data, to obtain a local masking result.

The sending module 142 is configured to send the local masking result to a security service server.

For a detailed process in which the processing module 141 determines the local masking result, refer to descriptions in the foregoing method embodiments. For example, for a process in which the processing module 141 determines the local statistical result by performing the steps shown in step 400 in FIG. 4, FIG. 5 or FIG. 6, and steps S10 to S22 in FIG. 11 and determines the local masking result by performing the steps described in step 410 in FIG. 4 and step S30 in FIG. 11, details are not described herein again.

Optionally, the protection system shown in FIG. 14 further includes a receiving module 143, further configured to receive a global masking result sent by the security service server, where the global masking result is obtained by analyzing local masking results from at least two protection devices by the security service server, the global masking result includes at least one entry, and each entry in the global masking result includes masked data.

The processing module 141 is further configured to: obtain first key data from a first packet, and perform masking processing on the first key data to obtain first masked data, where the first packet is a packet in the traffic that passes through the network location in which the protection system is applied; and if a first target entry exists in the global masking result, perform additional security detection on the first packet is skipped, where the first target entry includes the first masked data.

For a detailed process in which the processing module 141 performs, based on the global masking result or the local statistical result, trusted identification on the packet in the traffic that passes through the network location in which the protection device is applied, refer to descriptions in the embodiments shown in FIG. 9 to FIG. 11, and details are not described herein again. Optionally, the traffic identification module in the embodiment related to FIG. 1 or FIG. 11 is a submodule in the processing module 141.

For other functions that can be performed by the processing module 141, the sending module 142, or the receiving module 143, refer to the descriptions in the foregoing method embodiments.

The apparatus embodiment described in FIG. 14 is merely an example. For example, division into the modules is merely logical function division and may be other division in actual implementation. For example, a plurality of modules or components may be combined or integrated into another system, or some features may be ignored or not performed. Functional modules in embodiments of this application may be integrated into one processing module, or each module may exist alone physically, or two or more modules may be integrated into one module. The foregoing modules in FIG. 14 may be implemented in a form of hardware, or may be implemented in a form of a software functional unit. For example, when software is used for implementation, the processing module 141 may be implemented by a software functional module generated after the at least one processor 131 in FIG. 13 reads the program code stored in the memory. The foregoing modules in FIG. 14 may alternatively be respectively implemented by different hardware in the protection system. For example, the processing module 141 is implemented by a part of processing resources (for example, a core in the multi-core processor) in the at least one processor 131 in FIG. 13, and the sending module 142 and the receiving module 143 are implemented by the network interface 133 and a remaining part of the processing resources (for example, another core in the multi-core processor) in the at least one processor 131 in FIG. 13, or a field-programmable gate array (FPGA), or a programmable device such as a coprocessor. It is obvious that the foregoing functional module may be alternatively implemented by using a combination of software and hardware. For example, the sending module 142 and the receiving module 143 are implemented by using a hardware programmable device, and the processing module 141 is implemented by a software functional module generated after the CPU reads the program code stored in the memory.

Figure 15:
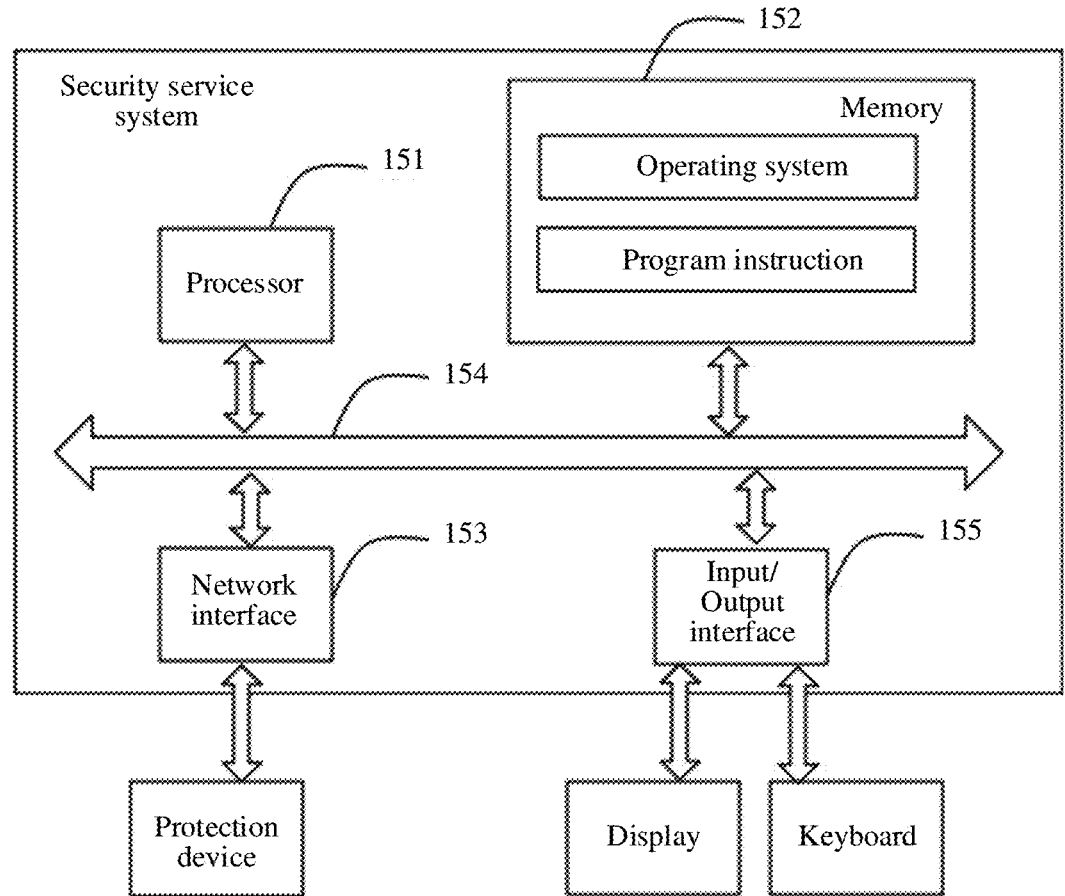
FIG. 15 is a schematic diagram of a structure of a security service system according to an embodiment of this application.

FIG. 15 is a schematic diagram of a structure of a security service system according to an embodiment of this application. The security service system having the structure shown in FIG. 15 implements a function of the security service server in the solution described in the foregoing embodiments. The security service system collects and analyzes masked data from a plurality of protection devices to obtain a global masking result. The global masking result reflects globally frequent key data. The security service system shares the global masking result with each protection device. Optionally, the security service system shown in FIG. 15 is the security service server in the application scenarios shown in FIG. 2 and FIG. 3, and performs a function of the security service server described in any embodiment shown in FIG. 7, FIG. 8, or FIG. 11. Collaboration between the security service system shown in FIG. 15 and the protection device in the application scenarios shown in FIG. 2 and FIG. 3 can improve an effect of identifying trusted traffic by the protection device.

The security service system shown in FIG. 15 includes a memory 152 and at least one processor 151.

Optionally, the processor 151 implements the method in the foregoing embodiments by reading instructions stored in the memory 152, or the processor 151 may implement the method in the foregoing embodiments by executing instructions stored inside. When the processor 151 implements the method in the foregoing embodiments by reading the instructions stored in the memory 152, the memory 152 stores the instructions for implementing the method provided in the foregoing embodiments of this application.

Optionally, the at least one processor 151 is one or more CPUs or a single-core CPU, or may be a multi-core CPU.

The memory 152 includes but is not limited to a RAM, a ROM, an EPROM, a flash memory, an optical memory, or the like. The memory 152 stores instructions of an operating system.

After the program instructions stored in the memory 152 are read by the at least one processor 151, the protection system performs the following operations:

receiving N local masking results, where each of the N local masking results comes from a protection device, N is a natural number greater than or equal to 2, each local masking result includes a plurality of entries, and each entry included in each local masking result includes masked data and a corresponding count value; and generating a global masking result based on the N local masking results, where the global masking result includes a plurality of entries, each entry included in the global masking result includes masked data, and the masked data included in the global masking result is a subset of the masked data included in the N local masking results; and sending the global masking result to at least one of the N protection devices.

Optionally, for a detailed process in which the processor 151 obtains the global masking result, refer to descriptions in FIG. 7, FIG. 8, or FIG. 11, and other related embodiments, and details are not described herein again.

Optionally, the security service system shown in FIG. 15 further includes a network interface 153. The network interface 153 may be a wired interface, for example, an FDDI or a GE interface; or the network interface 153 may alternatively be a wireless interface. The network interface 153 is configured to: receive the local masking result sent by the protection device in the scenario shown in FIG. 2 or FIG. 3, or send the global masking result to the protection device in the embodiment shown in FIG. 7, FIG. 8, or FIG. 11.

After the processor 151 reads the program instructions in the memory 152, for other functions that can be executed by the security service system, refer to the descriptions in the foregoing method embodiments.

Optionally, the security service system further includes a bus 154. The processor 151 and the memory 152 are usually connected to each other by using the bus 154, or may be connected to each other in another manner.

Optionally, the security service system further includes an input/output interface 155. The input/output interface 155 is configured to connect to an input device, and receive key data that is input by using the input device by a user or another device that can interact with the protection system. The input device includes, but is not limited to, a keyboard, a touchscreen, a microphone, and the like.

The security service system provided in embodiments of this application is configured to perform the method performed by the security service server provided in the foregoing method embodiments. The security service system obtains an analysis result of masked data from a plurality of protection devices, and shares the analysis result with each protection device, thereby expanding data that is used to configure an identification policy, so that the protection device can identify more trusted traffic, thereby further reducing an amount of data required to perform additional security detection.

Figure 16:
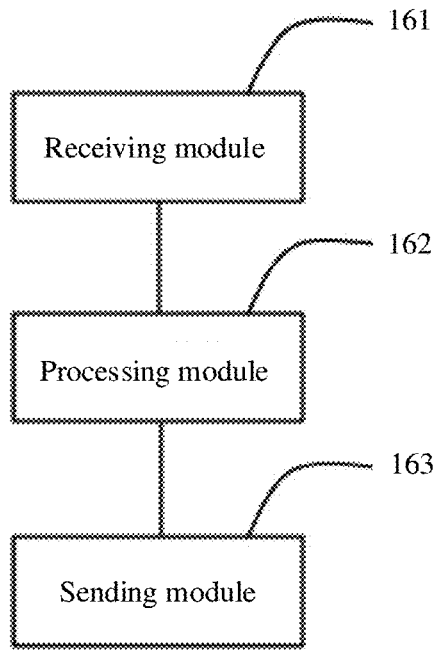
FIG. 16 is a schematic diagram of a structure of another security service system according to an embodiment of this application.

FIG. 16 is a schematic diagram of a structure of a security service system according to an embodiment of this application. The security service system having the structure shown in FIG. 16 implements a function of the security service server in the solution described in the foregoing embodiments. The security service system collects and analyzes masked data from a plurality of protection devices to obtain a global masking result. The global masking result reflects globally frequent key data. The security service system shares the global masking result with each protection device. Optionally, the security service system shown in FIG. 16 is the security service server in the application scenarios shown in FIG. 2 and FIG. 3, and performs a function of the security service server described in any embodiment shown in FIG. 7, FIG. 8, or FIG. 11. Collaboration between the security service system shown in FIG. 16 and the protection device in the application scenarios shown in FIG. 2 and FIG. 3 can improve an effect of identifying trusted traffic by the protection device. The security service system shown in FIG. 16 includes a receiving module 161, a processing module 162, and a sending module 163.

The receiving module 161 is configured to receive N local masking results, where each of the N local masking results comes from a protection device, N is a natural number greater than or equal to 2, each local masking result includes a plurality of entries, and each entry included in each local masking result includes masked data and a corresponding count value.

The processing module 162 is configured to generate a global masking result based on the N local masking results, where the global masking result includes a plurality of entries, each entry included in the global masking result includes masked data, and the masked data included in the global masking result is a subset of the masked data included in the N local masking results.

The sending module 163 is configured to send the global masking result to at least one of the N protection devices.

For a detailed process in which the processing module 162 determines the global masking result, refer to descriptions in the foregoing method embodiments. For example, the processing module 162 determines the global masking result by performing steps shown in step 710 in FIG. 7, step 800 and step 810 in FIG. 8, and step S40 in FIG. 11. Details are not described herein again.

For other functions that can be performed by the receiving module 161, the processing module 162, or the sending module 163, refer to the descriptions in the foregoing method embodiments.

The apparatus embodiment described in FIG. 16 is merely an example. For example, division into the modules is merely logical function division and may be other division in actual implementation. For example, a plurality of modules or components may be combined or integrated into another system, or some features may be ignored or not performed. Functional modules in embodiments of this application may be integrated into one processing module, or each module may exist alone physically, or two or more modules may be integrated into one module. The foregoing modules in FIG. 16 may be implemented in a form of hardware, or may be implemented in a form of a software functional unit. For example, when software is used for implementation, the processing module 162 may be implemented by a software functional module generated after the at least one processor 151 in FIG. 15 reads the program code stored in the memory. The foregoing modules in FIG. 16 may alternatively be respectively implemented by different hardware in the security service system. For example, the processing module 162 is implemented by a part of processing resources (for example, a core in the multi-core processor) in the at least one processor 151 in FIG. 15, and the sending module 163 and the receiving module 161 are implemented by the network interface 153 and a remaining part of the processing resources (for example, another core in the multi-core processor) in the at least one processor 151 in FIG. 15, or an FPGA, or a programmable device such as a coprocessor or the like. It is obvious that the foregoing functional module may be alternatively implemented by using a combination of software and hardware. For example, the receiving module 161 and the sending module 163 are implemented by using a hardware programmable device, and the processing module 162 is implemented by a software functional module generated after the CPU reads the program code stored in the memory.

An embodiment of this application further provides a network system, including a security service system (as shown in FIG. 15 or FIG. 16) and at least one protection system (as shown in FIG. 13 or FIG. 14). For a schematic diagram of the network system, refer to FIG. 2, FIG. 3, or FIG. 11.

Embodiments in this specification are all described in a progressive manner, for same or similar parts in embodiments, reference may be made to these embodiments, and each embodiment focuses on a difference from other embodiments. Especially, a system embodiment is basically similar to a method embodiment, and therefore is described briefly; for related parts, reference may be made to local descriptions in the method embodiment.

A person of ordinary skill in the art may understand that all or some of the aspects of this application or the possible implementations of the aspects may be implemented by software, hardware, firmware, or any combination thereof. When software is used to implement the embodiments, all or a part of the embodiments may be implemented in a form of a computer program product. The embodiments are specifically implemented as a computer program product. The computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semiconductor system, device, or apparatus, or any proper combination thereof. For example, the computer-readable storage medium is a random access memory (RAM), a read-only memory (ROM), an erasable programmable read-only memory (EPROM), or a portable read-only memory (CD-ROM).

It is clear that a person skilled in the art may make various modifications and variations to the present invention without departing from the scope of the present invention. The present invention is intended to cover these modifications and variations provided that they fall within the scope of protection defined by the following claims.

What is claimed is:

1. A method, comprising:

obtaining, by a protection device, a local statistical result, wherein the local statistical result indicates frequent key data in first traffic, the local statistical result comprises a first plurality of entries, each entry of the first plurality of entries comprises one piece of key data and a corresponding count value, and the first traffic is traffic that passes, in a first time segment, through a network location in which the protection device is applied;

replacing, by the protection device, a respective piece of key data of each entry of the first plurality of entries in the local statistical result with masked data corresponding to the respective piece of key data, to obtain a local masking result;

sending, by the protection device, the local masking result to a security service server;

receiving, by the protection device, a global masking result sent by the security service server, wherein the global masking result is obtained by analyzing local masking results from at least two protection devices by the security service server, the global masking result comprises at least one entry, and each entry in the global masking result comprises respective masked data;

determining, by the protection device, for a plurality of packets in traffic that passes through the network location in which the protection device is applied, whether key data from the packets correspond to a first target entry existing in the global masking result, wherein the plurality of packets comprises a first packet that has first key data that corresponds to the first target entry and a second packet that does not have the first key data that corresponds to the first target entry;

performing, by the protection device, additional security detection for the second packet based in part in response to the second packet not having the first key data that corresponds to the first target entry; and skipping, by the protection device, performing additional security detection on the first packet, in response to the first target entry existing in the global masking result, wherein the first target entry comprises first masked data corresponding to the first key data.

2. The method according to claim 1, wherein after obtaining, by the protection device, the first key data from the first packet, the method further comprises:

in response to a second target entry existing in the local statistical result, skipping, by the protection device, performing the additional security detection on the first packet, wherein the second target entry comprises the first key data; or in response to a second target entry not existing in the local statistical result, performing masking processing on the first key data to obtain the first masked data corresponding to the first key data.

3. The method according to claim 1, wherein, each entry of the first plurality of entries in the local statistical result further comprises a data type of the respective piece of key data in the entry, and each entry in the local masking results explicitly or implicitly indicates the data type of the respective piece of key data.

4. The method according to claim 3, wherein entries in the local masking result indicate different data types by masked data with different lengths.

5. The method according to claim 3, wherein each entry in the global masking result further explicitly or implicitly indicates a data type of the respective masked data in the entry in the global masking result.

6. The method according to claim 1, wherein the obtaining the local statistical result comprises:

obtaining, by the protection device, a plurality of pieces of key data from the first traffic based on a plurality of specified fields, wherein each of the plurality of pieces of key data is content of a specified field of a packet in the first traffic;

generating a corresponding entry for each piece of key data, to obtain a second plurality of entries, and recording, in the corresponding entry for each piece of key data, a count value corresponding to the key data, wherein the count value corresponding to the key data is a quantity of times that the key data is identified in the first time segment; and selecting a predetermined quantity or proportion of entries from the second plurality of entries based on count values of the second plurality of entries, generating a temporary statistical result, and determining the local statistical result based on the temporary statistical result.

7. The method according to claim 6, wherein determining the local statistical result based on the temporary statistical result comprises:

obtaining at least one prior temporary statistical result, wherein each of the at least one prior temporary statistical result is obtained based on traffic that passes, in a time segment before the first time segment, through the network location in which the protection device is applied; and combining entries, whose key data is the same, in the generated temporary statistical result and the prior temporary statistical result, to obtain the local statistical result, wherein a count value corresponding to key data in the local statistical result is obtained based on count values in entries, comprising the key data, in the temporary statistical result and the prior temporary statistical result.

8. The method according to claim 1, wherein, the masked data is obtained by performing a hash operation on the key data.

9. The method according to claim 1, wherein the corresponding count value comprises a corresponding occurrence frequency or occurrence times.

10. A method, comprising:

receiving, by a security service server, N local masking results, wherein each of the N local masking results comes from a protection device, N is a natural number greater than or equal to 2, each local masking result comprises a first plurality of entries, and each entry of the first plurality of entries comprised in each local masking result comprises respective first masked data and a corresponding first count value;

generating, by the security service server, a global masking result based on the N local masking results, wherein the global masking result comprises a second plurality of entries, each entry of the second plurality of entries comprised in the global masking result comprises second masked data, and the second masked data comprised in the global masking result is a subset of the respective first masked data comprised in the N local masking results; and sending, by the security service server, the global masking result to the protection device, wherein the global masking result comprises at least one entry, and each entry in the global masking result comprises respective masked data, the global masking result causing the protection device to perform:

determining, for a plurality of packets in traffic that passes through a network location in which the protection device is applied, whether key data from the packets correspond to a first target entry existing in the global masking result, wherein the plurality of packets comprises a first packet that has first key data that corresponds to the first target entry and a second packet that does not have the first key data that corresponds to the first target entry;

performing additional security detection for the second packet based in part in response to the second packet not having the first key data that corresponds to the first target entry; and skipping performing additional security detection on the first packet, in response to the first target entry existing in the global masking result, wherein the first target entry comprises first masked data corresponding to the first key data.

11. The method according to claim 10, wherein the generating the global masking result comprises:

combining, by the security service server, entries that are in the N local masking results and whose masked data is the same to obtain an intermediate masking result, wherein the intermediate masking result comprises a third plurality of entries, each entry of the third plurality of entries comprised in the intermediate masking result comprises third masked data and a corresponding second count value, and the corresponding second count value corresponding to the third masked data in each entry of the third plurality of entries comprised in the intermediate masking result is obtained based on first count values in the first plurality of entries that are in the N local masking results and that comprise the third masked data; and selecting, by the security service server, at least one selected entry from the intermediate masking result based on second count values in the third plurality of entries in the intermediate masking result, deleting a count value in the selected entry, and then obtaining the global masking result based on the selected entry whose count value is deleted.

12. The method according to claim 11, wherein the selecting the at least one selected entry comprises:

selecting, by the security service server from the intermediate masking result based on an order of count values from high to low, a predetermined quantity or proportion of the third plurality of entries comprising higher count values.

13. The method according to claim 11, wherein the corresponding second count value corresponding to the third masked data in each entry of the third plurality of entries comprised in the intermediate masking result is a weighted sum of the first count values in the first plurality of entries that are in the N local masking results and that comprise the third masked data, and the weighted sum is positively correlated with a sum of the first count values of the first plurality of entries that are in the N local masking results and that comprise the third masked data, is positively correlated with a quantity of the first plurality of entries that are in the N local masking results and that comprise the third masked data, and is negatively correlated with N.

14. The method according to claim 10, wherein each entry of the first plurality of entries comprised in each of the N local masking results further explicitly or implicitly indicates a data type, and each entry of the second plurality of entries comprised in the global masking result further explicitly or implicitly indicates the data type.

15. A system, comprising:
a memory configured to store program instructions;
at least one processor, wherein the program instructions, when executed by the at least one processor, cause the system to perform operations including:
    obtaining a local statistical result, wherein the local statistical result indicates frequent key data in first traffic, the local statistical result comprises a first plurality of entries, each entry of the first plurality of entries comprises one piece of key data and a corresponding count value, and the first traffic is traffic that passes, in a first time segment, through a network location in which the system is applied; and
    replacing a respective piece of key data of each entry of the first plurality of entries in the local statistical result with masked data corresponding to the respective piece of key data, to obtain a local masking result;
sending the local masking result to a security service server;
    receiving a global masking result sent by the security service server, wherein the global masking result is obtained by analyzing local masking results from at least two protection devices by the security service server, the global masking result comprises at least one entry, and each entry in the global masking result comprises respective masked data;
    determining, for a plurality of packets in traffic that passes through the network location in which the system is applied, whether key data from the packets correspond to a first target entry existing in the global masking result, wherein the plurality of packets comprises a first packet that has first key data that corresponds to the first target entry and a second packet that does not have the first key data that corresponds to the first target entry;
    performing additional security detection for the second packet based in part in response to the second packet not having the first key data that corresponds to the first target entry; and
    skipping performing additional security detection on the first packet, in response to the first target entry existing in the global masking result, wherein the first target entry comprises first masked data corresponding to the first key data.

16. The system according to claim 15, wherein after the program instructions, when executed by the at least one processor, further enables the system to perform operations including:
    in response to a second target entry existing in the local statistical result, skipping performing the additional security detection on the first packet, wherein the second target entry comprises the first key data; or
    in response to a second target entry not existing in the local statistical result, performing masking processing on the first key data to obtain the first masked data corresponding to the first key data.

17. The system according to claim 15, wherein the obtaining the local statistical result comprises:
    obtaining a plurality of pieces of key data from the first traffic based on a plurality of specified fields, wherein each of the plurality of pieces of key data is content of a specified field of a packet in the first traffic;
    generating a corresponding entry for each piece of key data, to obtain a second plurality of entries, and recording, in the corresponding entry for each piece of key data, a count value corresponding to the key data, wherein the count value corresponding to the key data is a quantity of times that the key data is identified in the first time segment; and
    selecting a predetermined quantity or proportion of entries from the second plurality of entries based on count values of the second plurality of entries, generating a temporary statistical result, and determining the local statistical result based on the temporary statistical result.

18. A system, comprising:
a memory configured to store program instructions;
at least one processor, wherein the program instructions, when executed by the at least one processor, cause the system to perform operations including:
    receiving N local masking results, wherein each of the N local masking results comes from a protection device, N is a natural number greater than or equal to 2, each local masking result comprises a first plurality of entries, and each entry of the first plurality of entries comprised in each local masking result comprises respective first masked data and a corresponding first count value; and
    generating a global masking result based on the N local masking results, wherein the global masking result comprises a second plurality of entries, each entry of the second plurality of entries comprised in the global masking result comprises second masked data, and the second masked data comprised in the global masking result is a subset of the respective first masked data comprised in the N local masking results;
sending the global masking result to the protection device, wherein the global masking result comprises at least one entry, and each entry in the global masking result comprises respective masked data, the global masking result causing the protection device to perform:
    determining, for a plurality of packets in traffic that passes through a network location in which the protection device is applied, whether key data from the packets correspond to a first target entry existing in the global masking result, wherein the plurality of packets comprises a first packet that has first key data that corresponds to the first target entry and a second packet that does not have the first key data that corresponds to the first target entry;
    performing additional security detection for the second packet based in part in response to the second packet not having the first key data that corresponds to the first target entry; and
    skipping performing additional security detection on the first packet, in response to the first target entry existing in the global masking result, wherein the first target entry comprises first masked data corresponding to the first key data.

19. The system according to claim 18, wherein the generating the global masking result comprises:

combining entries that are in the N local masking results and whose masked data is the same to obtain an intermediate masking result, wherein the intermediate masking result comprises a third plurality of entries, each entry of the third plurality of entries comprised in the intermediate masking result comprises third masked data and a corresponding second count value, and the corresponding second count value corresponding to the third masked data in each entry of the third plurality of entries comprised in the intermediate masking result is obtained based on first count values in the first plurality of entries that are in the N local masking results and that comprise the third masked data; and selecting at least one selected entry from the intermediate masking result based on second count values in the third plurality of entries in the intermediate masking result, deleting a count value in the selected entry, and then obtaining the global masking result based on the selected entry whose count value is deleted.

20. The system according to claim 19, wherein the selecting the at least one selected entry comprises:

selecting, from the intermediate masking result based on an order of count values from high to low, a predetermined quantity or proportion of the third plurality of entries comprising higher count values.

\*    \*    \*    \*    \*